US012335178B2

(12) United States Patent
Nam et al.

(10) Patent No.: US 12,335,178 B2
(45) Date of Patent: Jun. 17, 2025

(54) UPLINK REFERENCE SIGNAL TRANSMISSIONS DURING POWER SAVING OPERATIONS

(71) Applicant: QUALCOMM Incorporated, San Diego, CA (US)

(72) Inventors: Wooseok Nam, San Diego, CA (US); Peter Gaal, San Diego, CA (US); Linhai He, San Diego, CA (US); Tao Luo, San Diego, CA (US); Huilin Xu, Temecula, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 17/741,288

(22) Filed: May 10, 2022

(65) Prior Publication Data

US 2022/0368487 A1 Nov. 17, 2022

Related U.S. Application Data

(60) Provisional application No. 63/187,311, filed on May 11, 2021.

(51) Int. Cl.
*H04L 5/00* (2006.01)
*H04W 52/02* (2009.01)
*H04W 76/28* (2018.01)

(52) U.S. Cl.
CPC ....... *H04L 5/0048* (2013.01); *H04W 52/0229* (2013.01); *H04W 76/28* (2018.02)

(58) Field of Classification Search
None
See application file for complete search history.

(56) References Cited

U.S. PATENT DOCUMENTS

2013/0294381 A1* 11/2013 Wang .................. H04L 5/0051
370/329
2021/0084586 A1* 3/2021 Loehr .................. H04W 76/28
(Continued)

FOREIGN PATENT DOCUMENTS

EP    3799486 A1 *  3/2021

OTHER PUBLICATIONS

Apple Inc: "PDCCH Based Power Saving Channel Design for UE Power Saving", R1-1909457, PDCCH-Based Powersaving Channel V1.1, 3rd Generation Partnership Project (3GPP), Mobile Competence Centre, 650, Route Des Lucioles, F-06921, Sophia-Antipolis Cedex, France, vol. RAN WG1, No. Prague, Czech, Aug. 26, 2019-Aug. 30, 2019, Aug. 20, 2019 (Aug. 20, 2019), pp. 1-10, XP051766063.

(Continued)

*Primary Examiner* — Faiyazkhan Ghafoerkhan
(74) *Attorney, Agent, or Firm* — Holland & Hart LLP

(57) ABSTRACT

Methods, systems, and devices for wireless communications are described in which a user equipment (UE) may be configured for discontinuous reception (DRX) operations using wakeup signals. The UE may monitor periodic wakeup signal occasions for wakeup signals and, in the event that the UE detects a wakeup indication that the UE is to initiate an active duration, the UE may power on transmit/receive circuitry for communications with a base station. In an absence of receiving the wakeup indication, the UE may be configured to transmit an uplink reference signal (e.g., a sounding reference signal) to the base station in an inactive duration of a DRX cycle in some cases. The uplink reference signal may be measured at the base station and used to determine one or more parameters for subsequent communications with the UE.

30 Claims, 18 Drawing Sheets

(56) References Cited

U.S. PATENT DOCUMENTS

2022/0209920 A1* 6/2022 Wu .................. H04W 52/0225
2022/0225151 A1* 7/2022 Zhang .................. H04W 24/10
2022/0368487 A1* 11/2022 Nam .................... H04L 5/0051

OTHER PUBLICATIONS

International Search Report and Written Opinion—PCT/US2022/028777—ISA/EPO—Aug. 24, 2022 (2104821WO).

* cited by examiner

UPLINK REFERENCE SIGNAL TRANSMISSIONS DURING POWER SAVING OPERATIONS

CROSS REFERENCE

The present application for patent claims the benefit of U.S. Provisional Patent Application No. 63/187,311 by NAM et al., entitled "UPLINK REFERENCE SIGNAL TRANSMISSIONS DURING POWER SAVING OPERATIONS," filed May 11, 2021, assigned to the assignee hereof, and expressly incorporated by reference herein.

FIELD OF TECHNOLOGY

The following relates to wireless communications, including uplink reference signal transmissions during power saving operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support discontinuous reception (DRX) operations, in which a UE may transition to a lower power mode for certain time periods in order to conserve power. Such DRX operations may in some cases result in channel measurements between the UE and a serving base station becoming stale, and subsequent communications between the UE and base station may be degraded until updated measurements are obtained. As demand for communication efficiency increases, efficient determination of channel conditions and transmission parameters may help to enhance wireless communications, such as for high reliability or low latency communications, among other examples.

SUMMARY

The described techniques relate to improved methods, systems, devices, and apparatuses that support uplink reference signal transmissions during power saving operations. In accordance with various aspects, described techniques may be used to configure a communications device (e.g., a user equipment (UE)) for discontinuous reception (DRX) operation, in which the communications device stays in a lower power state and monitors wakeup signal occasions for a wakeup indication to transition into an ON-state for a DRX on-duration. In various aspects as discussed herein, the communications device, when configured for DRX operation, may transmit an uplink reference signal (e.g., a sounding reference signal (SRS)) in some cases irrespective of a wakeup indication for the UE in a corresponding wakeup signal occasion of the DRX cycle.

A method for wireless communication at a user equipment (UE) is described. The method may include monitoring a wakeup signal monitoring occasion in an inactive duration of a discontinuous reception cycle for a wakeup indication associated with a wakeup signal, where an active duration of the discontinuous reception cycle is initiated at the UE based on detection of the wakeup indication for the UE during the wakeup signal monitoring occasion and transmitting, based on an absence of the wakeup signal indicator for the UE in the wakeup signal monitoring occasion, an uplink reference signal during a first time duration that is outside of the active duration of a first discontinuous reception cycle.

An apparatus for wireless communication at a UE is described. The apparatus may include at least one processor, memory coupled with the at least one processor, and instructions stored in the memory. The instructions may be executable by the at least one processor to cause the apparatus to monitor a wakeup signal monitoring occasion in an inactive duration of a discontinuous reception cycle for a wakeup indication associated with a wakeup signal, where an active duration of the discontinuous reception cycle is initiated at the UE based on detection of the wakeup indication for the UE during the wakeup signal monitoring occasion and transmit, based on an absence of the wakeup signal indicator for the UE in the wakeup signal monitoring occasion, an uplink reference signal during a first time duration that is outside of a first active duration of the discontinuous reception cycle.

Another apparatus for wireless communication at a UE is described. The apparatus may include means for monitoring a wakeup signal monitoring occasion in an inactive duration of a discontinuous reception cycle for a wakeup indication associated with a wakeup signal, where an active duration of the discontinuous reception cycle is initiated at the UE based on detection of the wakeup indication for the UE during the wakeup signal monitoring occasion and means for transmitting, based on an absence of the wakeup signal indicator for the UE in the wakeup signal monitoring occasion, an uplink reference signal during a first time duration that is outside of the active duration of a first discontinuous reception cycle.

A non-transitory computer-readable medium storing code for wireless communication at a UE is described. The code may include instructions executable by at least one processor to monitor a wakeup signal monitoring occasion in an inactive duration of a discontinuous reception cycle for a wakeup indication associated with a wakeup signal, where an active duration of the discontinuous reception cycle is initiated at the UE based on detection of the wakeup indication for the UE during the wakeup signal monitoring occasion and transmit, based on an absence of the wakeup signal indicator for the UE in the wakeup signal monitoring occasion, an uplink reference signal during a first time duration that is outside of the active duration of a first discontinuous reception cycle.

Some examples of the method, apparatuses, and non-transitory computer-readable medium described herein may further include operations, features, means, or instructions for receiving configuration information for a set of multiple uplink reference signal resources for transmission of a set of multiple uplink reference signals, and where the transmitting the uplink reference signal includes transmitting one or more uplink reference signals on a subset of the set of multiple uplink reference signal resources. In some examples of the method, apparatuses, and non-transitory computer-readable medium described herein, the configuration information provides uplink reference signal resources for uplink reference signal transmissions within the active duration and provides separately configured uplink reference signal resources for uplink reference signal transmissions outside of the active duration.

In some examples of the method, apparatuses, and non-transitory computer-readable medium described herein, the transmitting the uplink reference signal may be based on a type of reference signal resource of the set of multiple uplink reference signal resources that is present in the first time duration. In some examples of the method, apparatuses, and non-transitory computer-readable medium described herein, the type of reference signal resource includes one or more of a periodic sounding reference signal (SRS) resource, a semi-persistent SRS resource, an aperiodic SRS resource, SRS resources with periodicity larger than a threshold value, SRS resources configured with one or more usages, or any combinations thereof.

Some examples of the method, apparatuses, and non-transitory computer-readable medium described herein may further include operations, features, means, or instructions for transmitting, based on the absence of the wakeup indication for the UE in the wakeup signal monitoring occasion, a channel state information (CSI) report during the first time duration that is outside of the active duration of the first discontinuous reception cycle.

In some examples of the method, apparatuses, and non-transitory computer-readable medium described herein, the uplink reference signal during the first time duration that is outside of the active duration of the first discontinuous reception cycle has one or more transmission parameters that are different than transmission parameters of uplink reference signals transmitted within the active duration of the first discontinuous reception cycle. In some examples of the method, apparatuses, and non-transitory computer-readable medium described herein, the one or more transmission parameters include one or more of a reference signal periodicity, number of antenna ports for reference signal transmission, a transmission power, a timing advance value, a set of time and frequency resources, or any combinations thereof, and where the one or more transmission parameters are determined based on a separate configuration or a predetermined rule associated with uplink reference signal transmissions during the first time duration that is outside of the active duration of the first discontinuous reception cycle.

In some examples of the method, apparatuses, and non-transitory computer-readable medium described herein, the first time duration corresponds to a time duration of a discontinuous reception on-duration timer, a configured number of uplink reference signal transmission periods, or to a time duration that is different from the time duration of the discontinuous reception on-duration timer.

Some examples of the method, apparatuses, and non-transitory computer-readable medium described herein may further include operations, features, means, or instructions for monitoring, after the transmitting the uplink reference signal, for a downlink control channel transmission for a second time duration. In some examples of the method, apparatuses, and non-transitory computer-readable medium described herein, the downlink control channel transmission provides a transmit power control command for the UE that is based on the uplink reference signal. In some examples of the method, apparatuses, and non-transitory computer-readable medium described herein, the second time duration is a configured duration of time after the uplink reference signal transmission, a predetermined duration of time after the uplink reference signal transmission, a remaining duration of time until an end of the first time duration, or a zero-duration period that indicates no monitoring for the downlink control channel transmission.

Some examples of the method, apparatuses, and non-transitory computer-readable medium described herein may further include operations, features, means, or instructions for transmitting a capability indication that indicates that the UE is capable for uplink reference signal transmissions outside of the active duration of the discontinuous reception cycle.

A method for wireless communication at an access network entity is described. The method may include configuring a UE for discontinuous reception operation with wakeup signal monitoring, where an active duration of a discontinuous reception cycle is initiated based on detection of a wakeup indication that is transmitted during the wakeup signal monitoring occasion and receiving, in an absence of the wakeup indication being transmitted during the wakeup signal monitoring occasion, an uplink reference signal from the UE during a first time duration that is outside of the active duration of a first discontinuous reception cycle, where one or more parameters for communications with the UE are determined based on the uplink reference signal.

An apparatus for wireless communication at an access network entity is described. The apparatus may include at least one processor, memory coupled with the at least one processor, and instructions stored in the memory. The instructions may be executable by the at least one processor to cause the access network entity to configure a UE for discontinuous reception operation with wakeup signal monitoring, where an active duration of a discontinuous reception cycle is initiated based on detection of a wakeup indication that is transmitted during the wakeup signal monitoring occasion and receive, in an absence of the wakeup indication being transmitted during the wakeup signal monitoring occasion, an uplink reference signal from the UE during a first time duration that is outside of the active duration of a first discontinuous reception cycle, where one or more parameters for communications with the UE are determined based on the uplink reference signal.

Another apparatus for wireless communication at an access network entity is described. The apparatus may include means for configuring a UE for discontinuous reception operation with wakeup signal monitoring, where an active duration of a discontinuous reception cycle is initiated based on detection of a wakeup indication that is transmitted during the wakeup signal monitoring occasion and means for receiving, in an absence of the wakeup indication being transmitted during the wakeup signal monitoring occasion, an uplink reference signal from the UE during a first time duration that is outside of the active duration of a first discontinuous reception cycle, where one or more parameters for communications with the UE are determined based on the uplink reference signal.

A non-transitory computer-readable medium storing code for wireless communication at an access network entity is described. The code may include instructions executable by at least one processor to configure a UE for discontinuous reception operation with wakeup signal monitoring, where an active duration of a discontinuous reception cycle is initiated based on detection of a wakeup indication that is transmitted during the wakeup signal monitoring occasion and receive, in an absence of the wakeup indication being transmitted during the wakeup signal monitoring occasion, an uplink reference signal from the UE during a first time duration that is outside of the active duration of a first discontinuous reception cycle, where one or more parameters for communications with the UE are determined based on the uplink reference signal.

In some examples of the method, apparatuses, and non-transitory computer-readable medium described herein, the configuring may include operations, features, means, or instructions for configuring a set of multiple uplink reference signal resources for transmission of a set of multiple uplink reference signals, and where the receiving the uplink reference signal includes receiving one or more uplink reference signals on a subset of the set of multiple uplink reference signal resources. In some examples of the method, apparatuses, and non-transitory computer-readable medium described herein, the configuration information provides uplink reference signal resources for uplink reference signal transmissions within the active duration and provides separately configured uplink reference signal resources for uplink reference signal transmissions outside of the active duration.

In some examples of the method, apparatuses, and non-transitory computer-readable medium described herein, the receiving the uplink reference signal may be based on a type of reference signal resource of the set of multiple uplink reference signal resources that is present in the first time duration. In some examples of the method, apparatuses, and non-transitory computer-readable medium described herein, the type of reference signal resource includes one or more of a periodic SRS resource, a semi-persistent SRS resource, an aperiodic SRS resource, SRS resources with periodicity larger than a threshold value, SRS resources configured with one or more usages, or any combinations thereof.

Some examples of the method, apparatuses, and non-transitory computer-readable medium described herein may further include operations, features, means, or instructions for receiving, in the absence of the wakeup indication being transmitted to the UE, a CSI report during the first time duration that is outside of the active duration of the first discontinuous reception cycle.

In some examples of the method, apparatuses, and non-transitory computer-readable medium described herein, the uplink reference signal during the first time duration that is outside of the active duration of the first discontinuous reception cycle has one or more transmission parameters that are different than transmission parameters of uplink reference signals transmitted within active durations of one or more discontinuous reception cycles. In some examples of the method, apparatuses, and non-transitory computer-readable medium described herein, the one or more transmission parameters include one or more of a reference signal periodicity, number of antenna ports for reference signal transmission, a transmission power, a timing advance value, a set of time and frequency resources, or any combinations thereof, and where the one or more transmission parameters are determined based on a separate configuration or a predetermined rule associated with uplink reference signal transmissions during the first time duration. In some examples of the method, apparatuses, and non-transitory computer-readable medium described herein, the first time duration corresponds to a time duration of a discontinuous reception on-duration timer, a configured number of uplink reference signal transmission periods, or to a time duration that is different from the time duration of the discontinuous reception on-duration timer.

Some examples of the method, apparatuses, and non-transitory computer-readable medium described herein may further include operations, features, means, or instructions for transmitting, after the receiving the uplink reference signal, a downlink control channel transmission to the UE during a second time duration. In some examples of the method, apparatuses, and non-transitory computer-readable medium described herein, the downlink control channel transmission provides a transmit power control command for the UE that is based on the uplink reference signal. In some examples of the method, apparatuses, and non-transitory computer-readable medium described herein, the second time duration is a configured duration of time after the uplink reference signal transmission, a predetermined duration of time after the uplink reference signal transmission, a remaining duration of time until an end of the first time duration, or a zero-duration period that indicates no monitoring for the downlink control channel transmission.

Some examples of the method, apparatuses, and non-transitory computer-readable medium described herein may further include operations, features, means, or instructions for receiving, from the UE, a capability indication that indicates that the UE is capable for uplink reference signal transmissions outside of active durations of discontinuous reception cycles.

DETAILED DESCRIPTION

Figure 1:
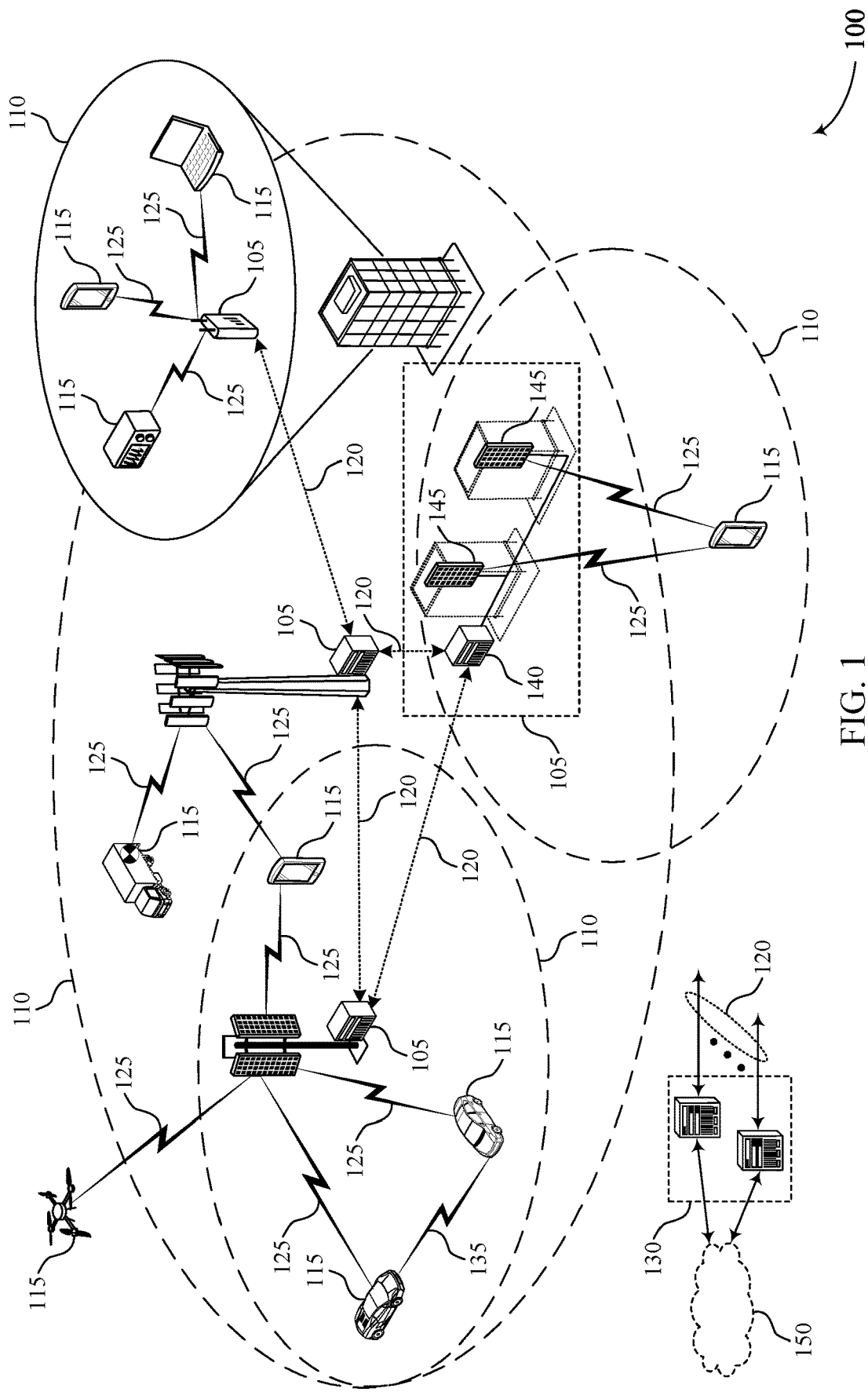
FIG. 1 illustrates an example of a wireless communications system that supports uplink reference signal transmissions during power saving operations in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies (RATs) including fourth generation (4G) systems, such as Long Term Evolution (LTE) systems, as well as fifth generation (5G) systems, which may be referred to as New Radio (NR) systems. Some UEs may support discontinuous reception (DRX) operations, in which the UE remains in a low power state during an inactive duration in the DRX cycle, and transitions to a higher power state for transmitting and receiving communications during an active or on duration of the DRX cycle.

In some cases, UEs may be configured for wakeup signal monitoring, in which periodic wakeup signal occasions are configured, and a UE monitors for a wakeup indication associated with a wakeup signal from a base station in the wakeup signal occasions. In the event that the UE detects a wakeup indication in a wakeup signal (e.g., a bit or flag in a wakeup signal that indicates the UE is to transition to initiate an active duration), the UE initiates the active duration (e.g., by powering on transmit/receive components for communicating with the base station). If the UE does not detect a wakeup signal, or if the UE detects no wakeup indication in the wakeup signal (e.g., a wakeup indicator assigned for the UE within the wakeup signal is set to zero), the UE remains in the inactive duration. In some cases, the UEs may be configured to transmit uplink reference signal (e.g., sounding reference signal (SRS) transmissions) in an active duration of a DRX cycle. The uplink reference signal may be measured at the base station, and used to determine one or more transmission parameters for subsequent communications with the UE (e.g., a transmit power for subsequent communications). However, in cases where the UE does not detect a wakeup indication for an extended period of time, measurements associated with SRS transmissions may become stale and result in degraded communications until fresh measurements and associated transmission parameters are obtained. In accordance with various aspects as discussed herein, such a UE may in some cases transmit an uplink reference signal during an inactive duration of a DRX cycle in an absence of detection of a wakeup indication.

As demand for communication efficiency increases, SRS transmissions may be increasingly important for beam management, among other wireless operations. For example, SRS transmission may enable the maintenance or improvement of a beam link quality between the base station and the UE. Additionally, for UEs operating according to a wakeup signal configuration, it may be advantageous to maintain directional communication beams for receiving the wakeup signal to enable power saving, as well as for receiving control information and data with sufficient reliability and throughput. A UE that may transmit SRS during an inactive duration of a DRX cycle based on an absence of a wakeup indication may allow for efficient maintenance of beams. For example, the described techniques may provide for a UE to monitor a wakeup signal monitoring occasion, and if the UE does not receive a wakeup signal, or if the UE is not indicated to wake up in a received wakeup signal, the UE may transmit, to a base station, a SRS during an inactive duration of the respective DRX cycle. The base station may receive the SRS, perform one or more channel measurements, and determine one or more transmission parameters for subsequent communications with the UE. As such, the UE may provide SRS (or other uplink reference signal or communication for use in channel measurement by the base station) during an inactive duration of the DRX cycle to improve reliability and throughput.

In some aspects, the described uplink reference signal transmission techniques may be used to improve beam management in 5G systems. In some examples, the UE may be configured with persistent scheduled resources or semi-persistent scheduled resources on which the UE may transmit the uplink reference signals. Various techniques as discussed herein may thus provide benefits and enhancements to the operation of UEs and base stations. For example, by maintaining directional communication beams for communications between a UE and base station, the UE may reduce power consumption by decreasing latency for communications and, as a result, may also improve the reliability of the directional communications, among other benefits.

Aspects of the disclosure are initially described in the context of wireless communications systems. Aspects of the disclosure are then illustrated by and described with references to timelines that relate to DRX operation and SRS transmissions. Aspects of the disclosure are further illustrated by and described with reference to apparatus diagrams, system diagrams, and flowcharts that relate to channel state information reporting over discontinuous reception operations.

FIG. 1 illustrates an example of a wireless communications system 100 that supports uplink reference signal transmissions during power saving operations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), etc., and NB-IoT may include eNB-IoT (enhanced NB-IoT), and FeNB-IoT (further enhanced NB-IoT).

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more UEs 115 may be configured for DRX operations using wakeup signals. In such cases, a UE 115 may monitor periodic wakeup signal occasions for wakeup signals. In the event that the UE 115 detects a wakeup signal with a wakeup indication that the UE is to initiate an active duration, the UE may transition to power on transmit/receive circuitry for communications with a base station 105. In some cases, in an absence of receiving the wakeup indication, the UE 115 may be configured to transmit an uplink reference signal (e.g., a SRS) to the base station 105 in an inactive duration of a DRX cycle. The uplink reference signal may be measured at the base station 105 and used to determine one or more parameters for subsequent communications between the UE 115 and base station 105.

Figure 2:
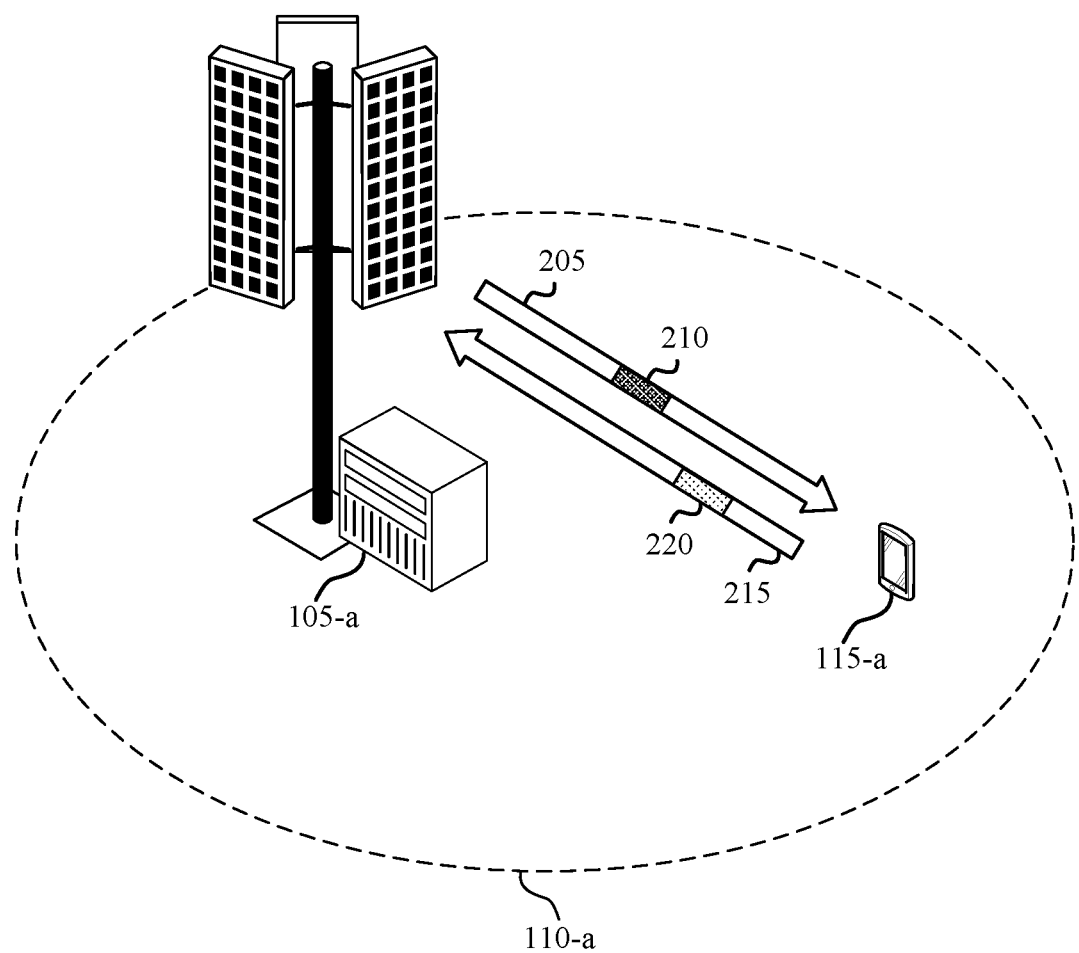
FIG. 2 illustrates an example of a portion of a wireless communications system that supports uplink reference signal transmissions during power saving operations in accordance with aspects of the present disclosure.

FIG. 2 illustrates an example of a wireless communications system 200 that supports uplink reference signal transmissions during power saving operations in accordance with aspects of the present disclosure. In some examples, the wireless communications system 200 may implement aspects of the wireless communications system 100. For example, the wireless communications system 200 may include a base station 105-a and a UE 115-a within a geographic coverage area 110-a. The base station 105-a and the UE 115-a may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency through SRS transmissions in some DRX inactive durations, among other benefits.

The base station 105-a and the UE 115-a may be configured with multiple antennas, which may be used to employ techniques such as transmit diversity, receive diversity, multiple-input multiple-output communications, or beamforming, or any combination thereof. The antennas of the base station 105-a and the UE 115-a may be located within one or more antenna arrays or antenna panels, which may support multiple-input multiple-output operations or transmit or receive beamforming. For example, the base station 105-a antennas or antenna arrays may be co-located at an antenna assembly, such as an antenna tower. In some examples, antennas or antenna arrays associated with the base station 105-a may be located in diverse geographic locations. The base station 105-a may have an antenna array with a number of rows and columns of antenna ports that the base station 105-a may use to support beamforming of communications with the UE 115-a. Likewise, the UE 115-a may have one or more antenna arrays that may support various multiple-input multiple-output or beamforming operations. Additionally or alternatively, an antenna panel may support radio frequency beamforming for a signal transmitted via one or more antenna ports. The base station 105-a and the UE 115-a may thus be configured to support directional communications using the multiple antennas.

The UE 115-a, in the wireless communications system 200, may support various radio resource control (RRC) modes to preserve resources (for example, time and frequency resources of the wireless communications system 200), a battery life of the UE 115-a, among other examples. An RRC mode may include one or more of an RRC connected mode, an RRC idle mode, or an RRC inactive mode. In the RRC connected mode, the UE 115-a may have an active connection with the base station 105-a and operate according to a first power mode (for example, a normal power mode). In the RRC inactive mode, the UE 115-a may also have an active connection with the base station 105-a but may operate according to a second power mode (for example, a low power mode). In the RRC idle mode the UE 115-a may not have an active connection with the base station 105-a and thus may operate according to a third power mode (for example, a lower power mode compared to the RRC inactive mode).

The UE 115-a may be configured to support DRX operations for directional communications using the multiple antennas while operating in an RRC mode (for example, an RRC inactive mode). For example, in the RRC connected mode, DRX operations can yield power savings by allowing the UE 115-a to power down for one or more durations, as directed by the base station 105-a. In the RRC idle mode or in the RRC inactive mode, DRX operations can be used to further extend the time the UE 115-a spends in a lower power mode. DRX operations therefore offer improvement on resource utilization as well as power saving for the UE 115-a. In some examples, the UE 115-a may be configured to also support SRS transmissions during a DRX inactive time duration to further offer improvement to power savings and operations for the UE 115-a. The operations performed by the base station 105-a and the UE 115-a may also promote efficiency of the UE 115-a by reducing latency associated with processes related to high reliability and low latency directional communications operations (such as, beam management operations).

With reference to FIG. 2, the base station 105-a may configure the UE 115-a by transmitting a configuration message via one or more directional beams 205 (for example, downlink directional beams). The configuration message may include a configuration of a DRX cycle that includes wakeup signal monitoring occasions. In some examples, the configuration message may be an RRC configuration message. While in the RRC connected mode, the UE 115-a may receive the configuration message via the one or more directional beams 205 (for example, downlink directional beams). The base station 105-a may enable the UE 115-a to power on and monitor the wakeup signal monitoring occasions over an inactive duration of a DRX cycle based on configuration information carried in the RRC configuration message.

While monitoring the wakeup signal monitoring occasions in the DRX cycle, the UE 115-a may receive, from the base station 105-a, a wakeup signal 210. The wakeup signal 210 may indicate whether the UE 115-a is to wake up for a duration of the DRX cycle. For example, the wakeup signal 210 may provide an indication for the UE 115-a to wake up in an active duration associated with the DRX cycle to receive directional communications, for example, control information or data, or both from the base station 105-a.

Figure 3:
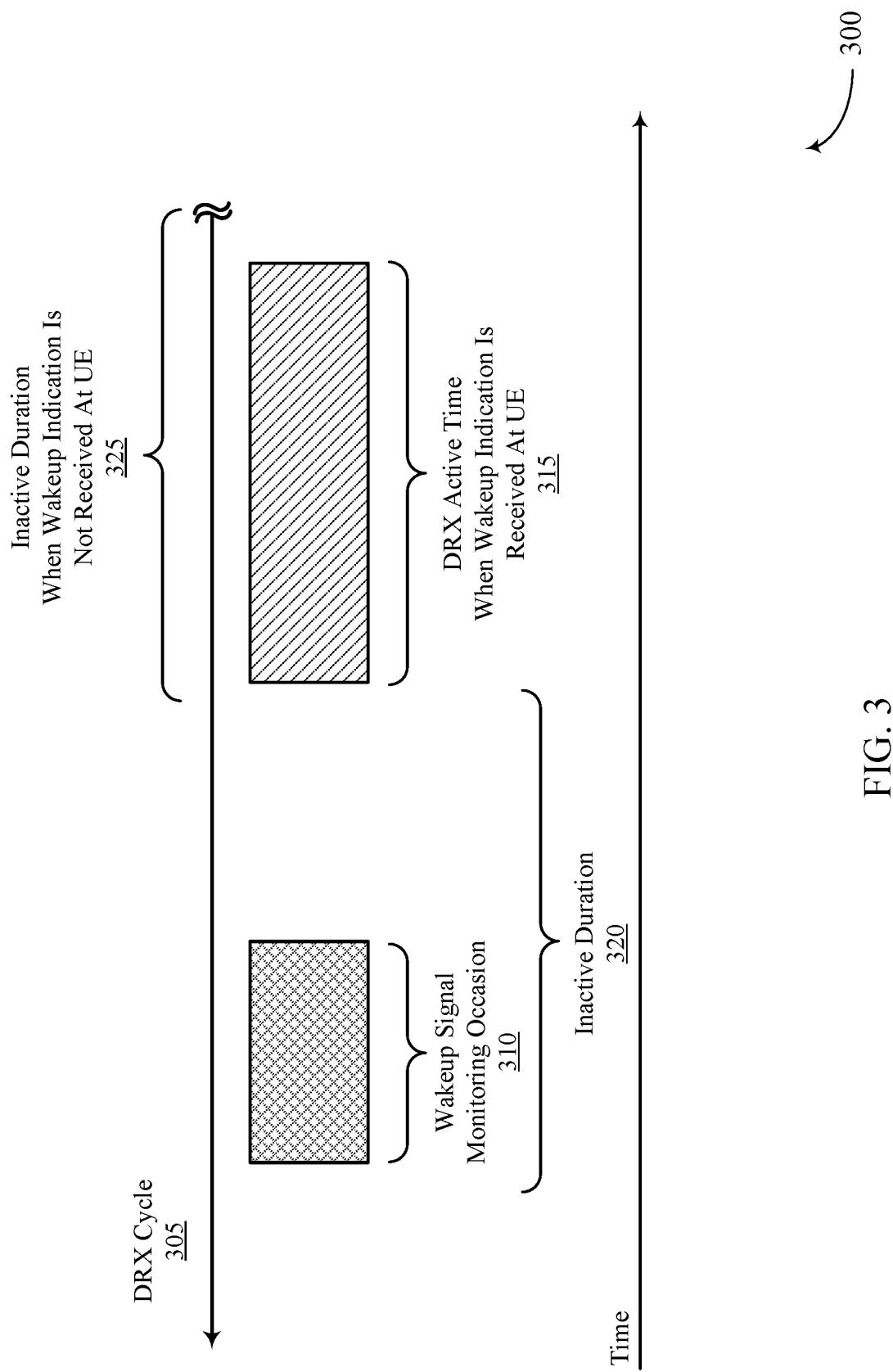
FIG. 3 illustrates an example of a DRX operation with wakeup signal monitoring that supports uplink reference signal transmissions during power saving operations in accordance with aspects of the present disclosure.

In some cases, the base station 105-a may not transmit, in a wakeup signal monitoring occasion, the wakeup signal 210 to the UE 115 via the one or more directional beams 205 (for example, downlink directional beams). In some cases, the UE 115 may be configured to support SRS operations to further offer improvements to power savings and operations for the UE 115-a. In some examples, because the UE 115-a did not receive a wakeup indication, such as by not receiving the wakeup signal 210, or receiving a wakeup signal but the wakeup signal did not include a wakeup indicator for the UE 115-a (e.g., a value of 1 in a wakeup indicator field of wakeup signal 210), the UE 115-a may transmit SRS 220 during an inactive duration of the DRX cycle using directional beam 215 (for example, an uplink directional beam). FIG. 3 illustrates an example of a DRX cycle with wakeup signal monitoring occasion and active/inactive durations in accordance with various techniques as discussed herein.

FIG. 3 illustrates an example of a DRX operation with wakeup signal monitoring 300 that supports uplink reference signal transmissions during power saving operations in accordance with aspects of the present disclosure. In some examples, the DRX operation with wakeup signal monitoring 300 may also implement aspects of the wireless communications system 100 and 200, as described with reference to FIGS. 1 and 2. For example, the DRX operation with wakeup signal monitoring 300 may be based on a configuration by a base station or a UE and may be implemented by the UE.

In the example of FIG. 3, a DRX cycle 305 may be configured at a UE, which may include configured time resources (e.g., a symbol duration, a slot duration, a subframe duration, a frame duration), as well as frequency resources (e.g., subcarriers, carriers). In some cases, a DRX cycle 305 may start at the point that a DRX ON duration would start, and run until a start of a subsequent DRX cycle 305. The DRX cycle 305 may include a wakeup signal monitoring occasion 310 and a DRX active time 315 (also referred to as the DRX ON duration). The wakeup signal monitoring occasion 310, or the DRX active time 315, or both may also correspond to time and frequency resources. For example, the wakeup signal monitoring occasion 310 and the DRX active time 315 may correspond to a number of subframe cycles, with each subframe in a cycle having a subframe index, that may, for example, range from 0 to 9. Each subframe cycle or subframe index or both may relate to one or more symbols and subcarriers.

In some cases, a serving base station may configure the UE with a wakeup signal monitoring occasion 310 to preserve resources (for example, time and frequency resources). Under DRX operations, the UE may be configured to monitor the wakeup signal monitoring occasion 310 of a DRX cycle during an inactive duration 320 of the DRX cycle 305. In some examples, the UE may be configured to monitor the wakeup signal monitoring occasion 310 of the DRX cycle based on being configured to monitor for a particular control information format from the base station (e.g., the UE may be configured to monitor for downlink control information (DCI) format 2_6 as defined in the 3GPP specification). In some cases, when the UE is configured to monitor for the particular control information format for a wakeup indication, the UE may receive, from a base station, a wakeup signal that may carry an indication to initiate the DRX active time 315 of the DRX cycle 305 for the UE.

In some cases, the base station may not transmit, in the wakeup signal monitoring occasion 310, a wakeup indication to the UE. Here, the UE may remain inactive during inactive duration 325. Thus the UE may refrain from powering on in the DRX cycle 305 because the absence of the wakeup signal 210 may be an indication to the UE that there are no upcoming communications (for example, control information or data, or both) from the base station, and thereby the UE may experience power savings.

For example, the UE may not monitor a downlink control channel (for example, a physical downlink control channel (PDCCH)) in the DRX active time 315. In other words, the UE 115 may exclusively monitor a downlink control channel (for example, a PDCCH) in the DRX active time 315 when the UE 115 receives a wakeup signal, and otherwise the DRX active time 315 can be skipped and the UE remains inactive in inactive duration 325.

In some examples, the UE 115 may be configured to transmit SRS even if a timer associated with DRX active time 315 is not started, which may further offer improvement to power savings and operations for the UE, as well as for managing communications between the base station and the UE. For example, the base station may receive SRS and determine communication parameters for subsequent communications with the UE (e.g., beam selection, precoding parameters, transmit power parameters). In some cases, such SRS transmissions may be used in conjunction with, or as an alternative to channel state information (CSI) reporting. In such cases, with downlink-uplink channel reciprocity, downlink CSI may be derived from uplink channel estimation by SRS at the base station. From the UE perspective, SRS-based CSI acquisition is more power efficient, as the UE transmits SRS and the CSI calculation is performed at the base station, as opposed to CSI reporting in which the UE measures a CSI reference signal (CSI-RS), calculates CSI (e.g., channel quality indicator (CQI), rank indicator (RI), precoding matrix indication (PMI), etc.), and transmits a CSI report to the base station. Further, even without channel reciprocity, SRS may allow the base station to acquire uplink channel quality to schedule uplink channels.

In some cases, the UE may be configured to monitor for a wakeup indication (e.g., by monitoring for DCI format 2_6), and may transmit certain SRSs outside DRX active time 315 time during a first duration of time. For example, if the UE is configured with multiple SRS resources or multiple SRS resource sets, a subset of the multiple SRS resources or multiple SRS resource sets may be identified for transmission of SRS. In other cases, each SRS resource or SRS resource set may individually be configured to be transmitted outside DRX active time. In further examples, one or more certain types of SRS resources may be configured to be transmitted outside DRX active time. For example, the certain types of SRS resources may be at least periodic SRS and/or semi-persistent SRS resources. Additionally or alternatively, the certain types of SRS resources may include a periodic SRS resource with periodicity larger than a certain threshold. Additionally or alternatively, the certain types of SRS resources may be SRS resources configured with a certain usage (e.g., one or more of beamManagement, codebook, nonCodebook, antennaSwitching).

In some cases, the configuration of the UE to enable SRS transmission outside active time may be bundled with or separate from a configuration to enable CSI measurement and reporting outside of DRX active time. In some cases, for a SRS resource or SRS resource set allowed to be transmitted outside of the DRX active time 315, some of the configuration parameters may be different when a SRS is transmitted during active time and outside active time, such as, for example, periodicity, number of antenna ports, transmission power, timing advance value, time and frequency resources, and the like. In some cases, different parameter values (e.g., a first set of parameter values one for during active time, and a second set of parameter values for outside active time) may be separately configured (e.g., by RRC) or determined based on a predetermined rule (e.g., periodicity is doubled when it is outside active time).

In some cases, the first duration of time that UE is allowed to transmit SRS may include, for example, a time duration that corresponds to a duration of a DRX on duration timer (e.g., a time duration indicated by drx-onDurationTimer) that would have run if a wakeup indication had been detected, a time duration of a configured number of SRS transmission periods, or configured timer (e.g., configured by RRC) that is different from the DRS on duration timer (e.g., different from a time that corresponds to a duration of drx-onDurationTimer).

In some cases, after transmission of SRS, the UE may enter DRX active time or monitor for a control information transmission (e.g., a physical downlink control channel (PDCCH) transmission) from the base station for a second duration of time. During this second duration of time, the UE may receive high priority or low latency communications (e.g., URLLC communications), and may receive a transmit power control command for the SRS (e.g., DCI format 2_3 with TPC-SRS-RNTI). In some cases, the second duration of time for control information monitoring may be a configured duration after each SRS transmission and before the next SRS transmission, a duration after the last SRS transmission to the end of the first time duration, or a zero-duration (i.e., no PDCCH monitoring after SRS transmission). In the case where there is no downlink control channel monitoring after the SRS transmission, if such a control information communication is needed (e.g., for SRS power control), the base station may transmit a wakeup indication to the UE at the next DRX cycle. Further, in some cases, SRS transmissions outside of DRX active time may be configured and enabled based on UE's capability, which the UE may report to the base station in a capability indication. In some cases, such a capability may depend on the capability of monitoring for a wakeup signal in a DRX configuration.

Figure 4:
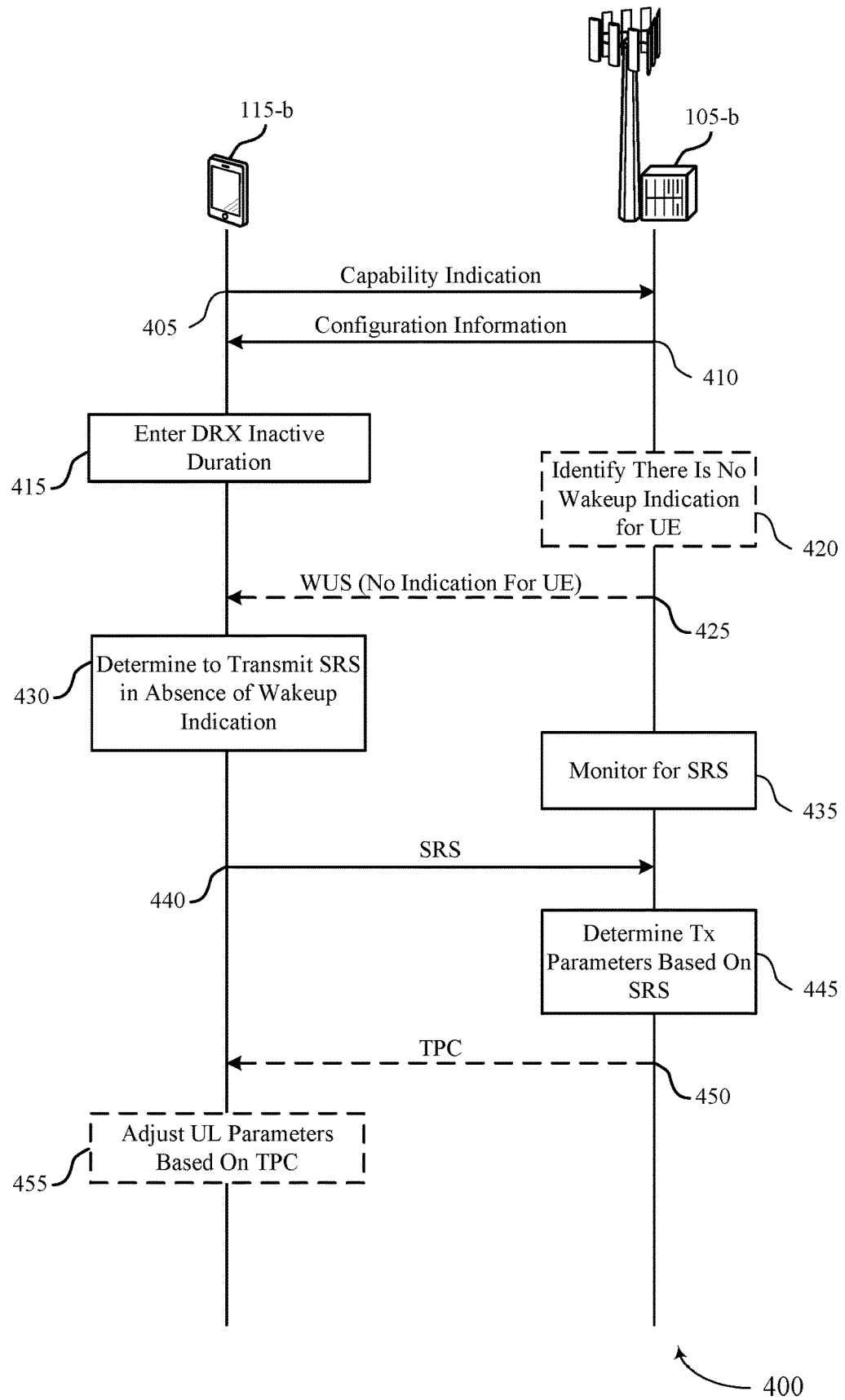
FIG. 4 illustrates an example of a process flow that supports uplink reference signal transmissions during power saving operations in accordance with aspects of the present disclosure.

FIG. 4 illustrates an example of a process flow 400 that supports uplink reference signal transmissions during power saving operations in accordance with aspects of the present disclosure. In some examples, process flow 400 may implement aspects of wireless communications system 100 or 200. Process flow 400 may be implemented by a UE 115-b and a base station 105-b as described herein. In the following description of the process flow 400, the communications between the UE 115-b and the base station 105-b may be transmitted in a different order than the example order shown, or the operations performed by the UE 115-b and base station 105-b may be performed in different orders or at different times. Some operations may also be omitted from the process flow 400, and other operations may be added to the process flow 400.

In some examples, the operations illustrated in process flow 400 may be performed by hardware (e.g., including circuitry, processing blocks, logic components, and other components), code (e.g., software) executed by at least one processor, or any combination thereof. Alternative examples of the following may be implemented, where some steps are performed in a different order than described or are not performed at all. In some cases, steps may include additional features not mentioned below, or further steps may be added.

At 405, the UE 115-b may transmit a capability indication to the base station 105-b that indicates a capability to transmit an uplink reference signal outside of a DRX active time. In some cases, the capability indication may also indicate a capability of the UE 115-b to monitor for wakeup signals in DRX operations. At 410, the base station 105-b may transmit configuration information to the UE 115-b. In some cases, the base station 105 may transmit RRC signaling including an indication that SRS transmissions outside of a DRX active time are enabled. In some cases, the configuration may provide that the UE 115-b is to monitor for a wakeup signal and wakeup indication (e.g., to monitor DCI format 2_6) from the base station 105-b to initiate a DRX active time, and that the UE 115-b is to transmit one or more SRS in some cases where a wakeup indication is not received, as discussed in various aspects herein.

At 415, the UE 115-b may enter a DRX inactive duration, based on the configured DRX operation. In some cases, the base station 105-b may, at 420, identify that a wakeup indication is not to be provided to the UE 115-b. For example, when formatting a wakeup signal the base station 105-b may not identify communications for the UE 115-b in the corresponding DRX cycle and may set a wakeup indication associated with UE 115-b to indicate to wake up. In such cases, at 425, the base station 105-b may transmit wakeup signal to the UE 115-b. In other cases, the base station 105-b may not transmit a wakeup signal to the UE 115-b unless there is a communication with the UE in the DRX cycle.

The UE 115-b may monitor for wakeup signals in wakeup signal monitoring occasions and, at 430, may determine to transmit SRS in an absence of receiving a wakeup indication from the base station 105-b. At 435, the base station 105-b may monitor for such an SRS, and at 440 the UE 115-b may transmit the SRS to the base station. In some cases, the SRS may be associated with a particular SRS resource, SRS resource set, type of SRS, or any combinations thereof, as discussed herein.

At 445, the base station 105-b may determine transmission parameters for subsequent communications with the UE 115-b based on measurements of the SRS from the UE 115-b. Optionally, at 450, the base station 105-b may transmit a transmit power control (TPC) command to the UE 115-b based on the measured SRS. In such cases, the UE 115-b may be configured to monitor for the TPC command for a second time duration after SRS transmission, and at 455 may adjust uplink power control parameters based on the TPC from the base station 105-b.

Figure 5:
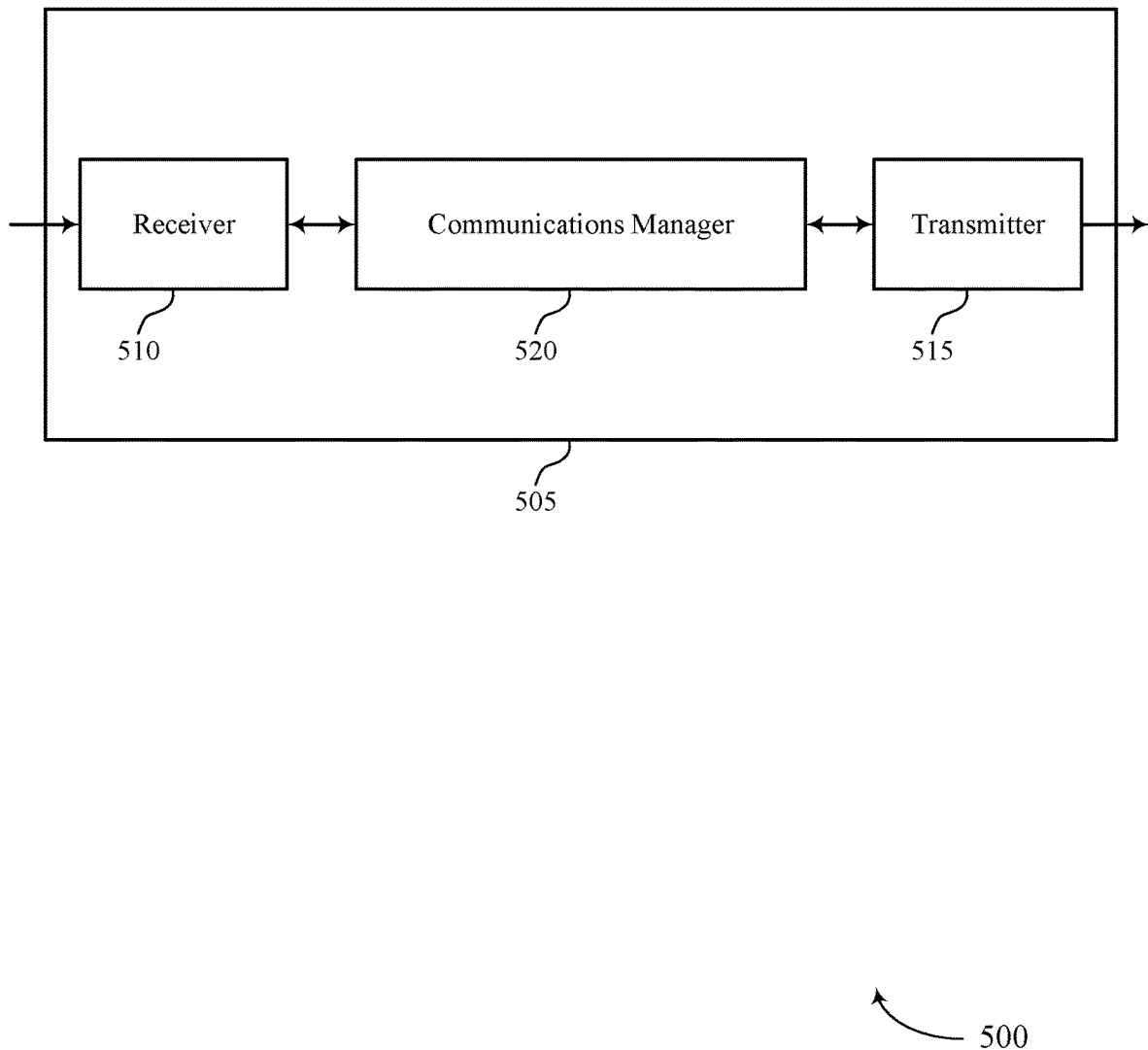
FIGS. 5 and 6 show block diagrams of devices that support uplink reference signal transmissions during power saving operations in accordance with aspects of the present disclosure.

FIG. 5 shows a block diagram 500 of a device 505 that supports uplink reference signal transmissions during power saving operations in accordance with aspects of the present disclosure. The device 505 may be an example of aspects of a UE 115 as described herein. The device 505 may include a receiver 510, a transmitter 515, and a communications manager 520. The device 505 may also include at least one processor. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink reference signal transmissions during power saving operations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to uplink reference signal transmissions during power saving operations). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of uplink reference signal transmissions during power saving operations as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include at least one processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 520, the receiver 510, the transmitter 515, or various combinations or components thereof may be implemented in code (e.g., as communications management software) executed by at least one processor. If implemented in code executed by at least one processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for monitoring a wakeup signal monitoring occasion in an inactive duration of a discontinuous reception cycle for a wakeup signal, where an active duration of the discontinuous reception cycle is initiated at the UE based on detection of a wakeup indication for the UE during the wakeup signal monitoring occasion. The communications manager 520 may be configured as or otherwise support a means for transmitting, based on an absence of the wakeup signal indicator for the UE in the wakeup signal monitoring occasion, an uplink reference signal during a first time duration that is outside of the active duration of a first discontinuous reception cycle.

By including or configuring the communications manager 520 in accordance with examples as described herein, the device 505 (e.g., at least one processor controlling or otherwise coupled to the receiver 510, the transmitter 515, the communications manager 520, or a combination thereof) may support techniques for uplink reference signal transmission outside of a DRX active time, that may reduce power consumption, decrease latency, and improve the reliability of the communications.

Figure 6:
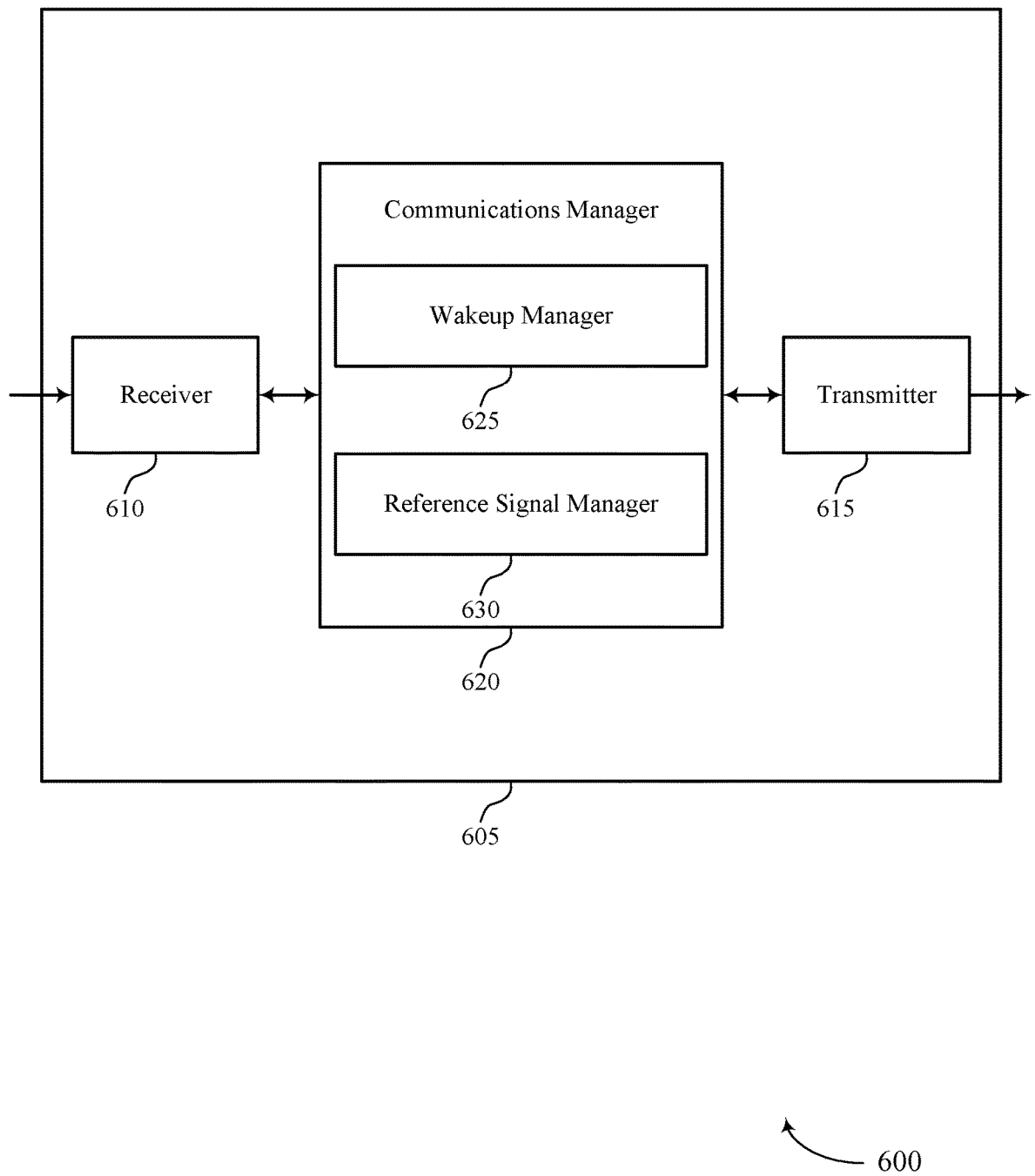

FIG. 6 shows a block diagram 600 of a device 605 that supports uplink reference signal transmissions during power saving operations in accordance with aspects of the present disclosure. The device 605 may be an example of aspects of a device 505 or a UE 115 as described herein. The device 605 may include a receiver 610, a transmitter 615, and a communications manager 620. The device 605 may also include at least one processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink reference signal transmissions during power saving operations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink reference signal transmissions during power saving operations). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of uplink reference signal transmissions during power saving operations as described herein. For example, the communications manager 620 may include a wakeup manager 625 a reference signal manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The wakeup manager 625 may be configured as or otherwise support a means for monitoring a wakeup signal monitoring occasion in an inactive duration of a discontinuous reception cycle for a wakeup signal, where an active duration of the discontinuous reception cycle is initiated at the UE based on detection of a wakeup indication for the UE during the wakeup signal monitoring occasion. The reference signal manager 630 may be configured as or otherwise support a means for transmitting, based on an absence of the wakeup signal indicator for the UE in the wakeup signal monitoring occasion, an uplink reference signal during a first time duration that is outside of the active duration of a first discontinuous reception cycle.

Figure 7:
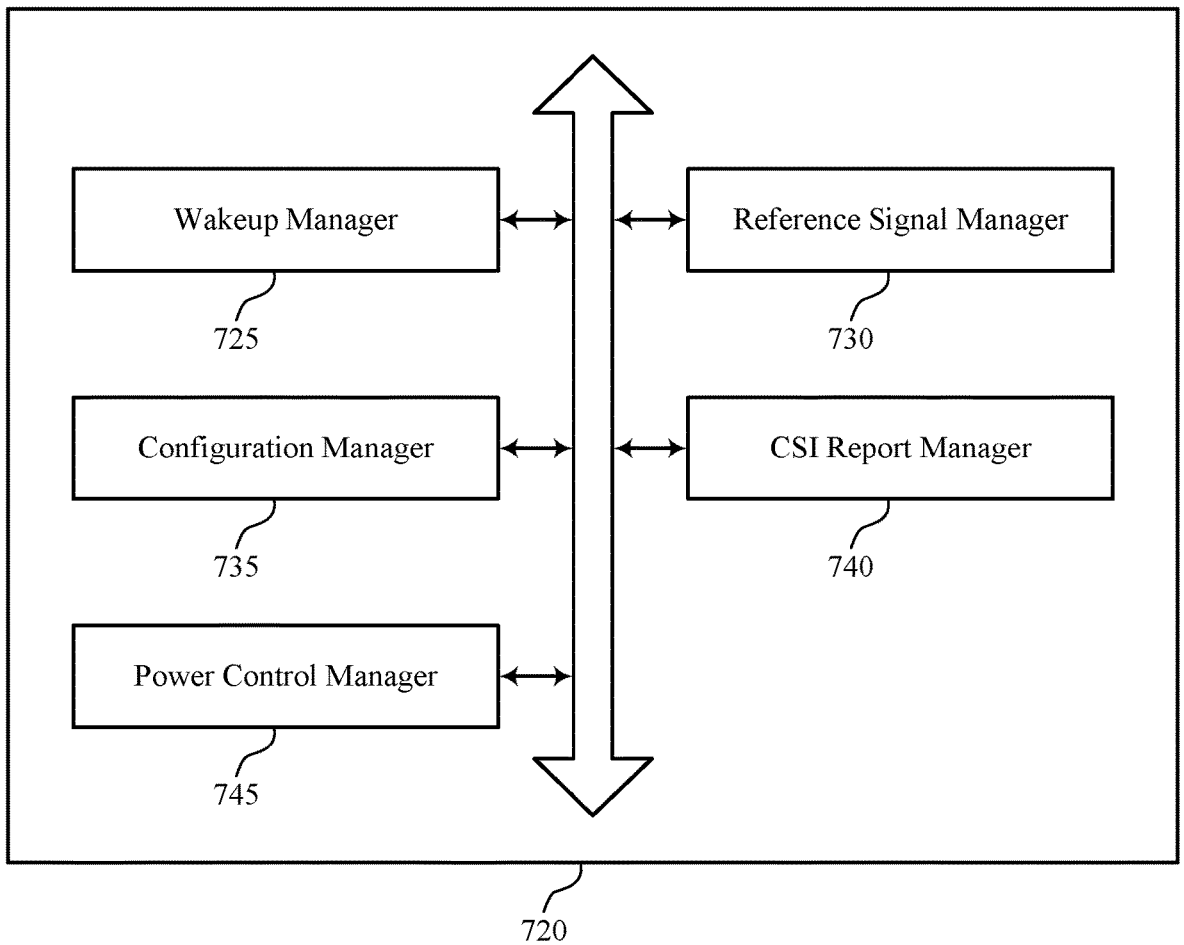
FIG. 7 shows a block diagram of a communications manager that supports uplink reference signal transmissions during power saving operations in accordance with aspects of the present disclosure.

FIG. 7 shows a block diagram 700 of a communications manager 720 that supports uplink reference signal transmissions during power saving operations in accordance with aspects of the present disclosure. The communications manager 720 may be an example of aspects of a communications manager 520, a communications manager 620, or both, as described herein. The communications manager 720, or various components thereof, may be an example of means for performing various aspects of uplink reference signal transmissions during power saving operations as described herein. For example, the communications manager 720 may include a wakeup manager 725, a reference signal manager 730, a configuration manager 735, a CSI report manager 740, a power control manager 745, or any combination thereof. Each of these components may communicate, directly or indirectly, with one another (e.g., via one or more buses).

The communications manager 720 may support wireless communication at a UE in accordance with examples as disclosed herein. The wakeup manager 725 may be configured as or otherwise support a means for monitoring a wakeup signal monitoring occasion in an inactive duration of a discontinuous reception cycle for a wakeup signal, where an active duration of the discontinuous reception cycle is initiated at the UE based on detection of a wakeup indication for the UE during the wakeup signal monitoring occasion. The reference signal manager 730 may be configured as or otherwise support a means for transmitting, based on an absence of the wakeup signal indicator for the UE in the wakeup signal monitoring occasion, an uplink reference signal during a first time duration that is outside of the active duration of a first discontinuous reception cycle.

In some examples, the configuration manager 735 may be configured as or otherwise support a means for receiving configuration information for a set of multiple uplink reference signal resources for transmission of a set of multiple uplink reference signals, and where the transmitting the uplink reference signal includes transmitting one or more uplink reference signals on a subset of the set of multiple uplink reference signal resources. In some examples, the configuration information provides uplink reference signal resources for uplink reference signal transmissions within the active duration and provides separately configured uplink reference signal resources for uplink reference signal transmissions outside of the active duration. In some examples, the transmitting the uplink reference signal is based on a type of reference signal resource of the set of multiple uplink reference signal resources that is present in the first time duration. In some examples, the type of reference signal resource includes one or more of a periodic SRS resource, a semi-persistent SRS resource, an aperiodic SRS resource, SRS resources with periodicity larger than a threshold value, SRS resources configured with one or more usages, or any combinations thereof.

In some examples, the CSI report manager 740 may be configured as or otherwise support a means for transmitting, based on the absence of the wakeup indication for the UE in the wakeup signal monitoring occasion, a CSI report during the first time duration that is outside of the active duration of the first discontinuous reception cycle. In some examples, the uplink reference signal during the first time duration that is outside of the active duration of the first discontinuous reception cycle has one or more transmission parameters that are different than transmission parameters of uplink reference signals transmitted within the active duration of the discontinuous reception cycle.

In some examples, the one or more transmission parameters include one or more of a reference signal periodicity, number of antenna ports for reference signal transmission, a transmission power, a timing advance value, a set of time and frequency resources, or any combinations thereof, and where the one or more transmission parameters are determined based on a separate configuration or a predetermined rule associated with uplink reference signal transmissions during the first time duration that is outside of the active duration of the first discontinuous reception cycle. In some examples, the first time duration corresponds to a time duration of a discontinuous reception on-duration timer, a configured number of uplink reference signal transmission periods, or to a time duration that is different from the time duration of the discontinuous reception on-duration timer.

In some examples, the power control manager 745 may be configured as or otherwise support a means for monitoring, after the transmitting the uplink reference signal, for a downlink control channel transmission for a second time duration. In some examples, the downlink control channel transmission provides a transmit power control command for the UE that is based on the uplink reference signal. In some examples, the second time duration is a configured duration of time after the uplink reference signal transmission, a predetermined duration of time after the uplink reference signal transmission, a remaining duration of time until an end of the first time duration, or a zero-duration period that indicates no monitoring for the downlink control channel transmission.

In some examples, the configuration manager 735 may be configured as or otherwise support a means for transmitting a capability indication that indicates that the UE is capable for uplink reference signal transmissions outside of the active duration of the discontinuous reception cycle.

Figure 8:
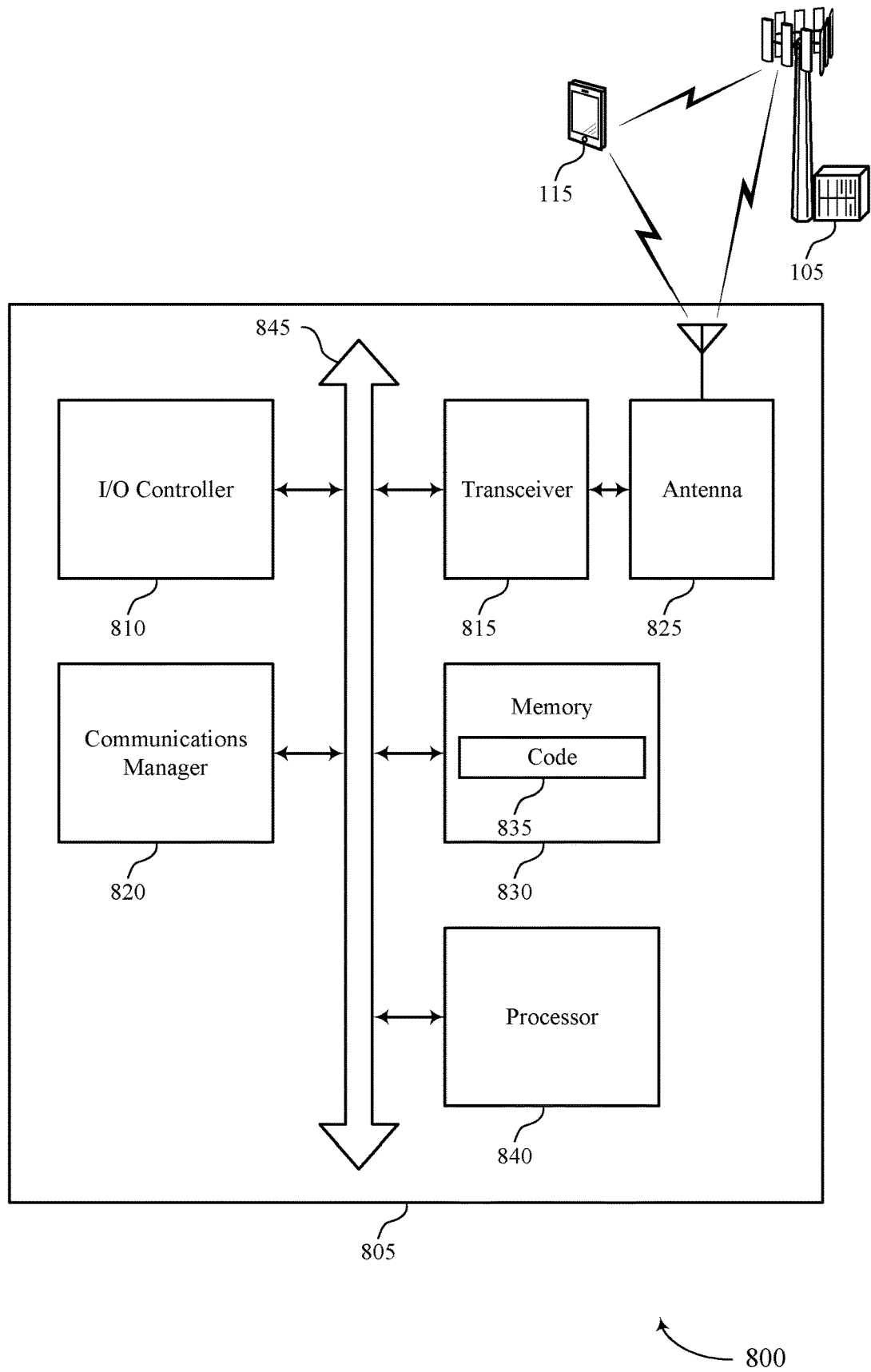
FIG. 8 shows a diagram of a system including a device that supports uplink reference signal transmissions during power saving operations in accordance with aspects of the present disclosure.

FIG. 8 shows a diagram of a system 800 including a device 805 that supports uplink reference signal transmissions during power saving operations in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink reference signal transmissions during power saving operations). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for monitoring a wakeup signal monitoring occasion in an inactive duration of a discontinuous reception cycle for a wakeup signal, where an active duration of the discontinuous reception cycle is initiated at the UE based on detection of a wakeup indication for the UE during the wakeup signal monitoring occasion. The communications manager 820 may be configured as or otherwise support a means for transmitting, based on an absence of the wakeup signal indicator for the UE in the wakeup signal monitoring occasion, an uplink reference signal during a first time duration that is outside of the active duration of a first discontinuous reception cycle.

By including or configuring the communications manager 820 in accordance with examples as described herein, the device 805 may support techniques for uplink reference signal transmission outside of a DRX active time, that may reduce power consumption, decrease latency, improve the reliability of the communications, and improve user experience.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of uplink reference signal transmissions during power saving operations as described herein, or the processor 840 and the memory 830 may be otherwise configured to perform or support such operations.

Figure 9:
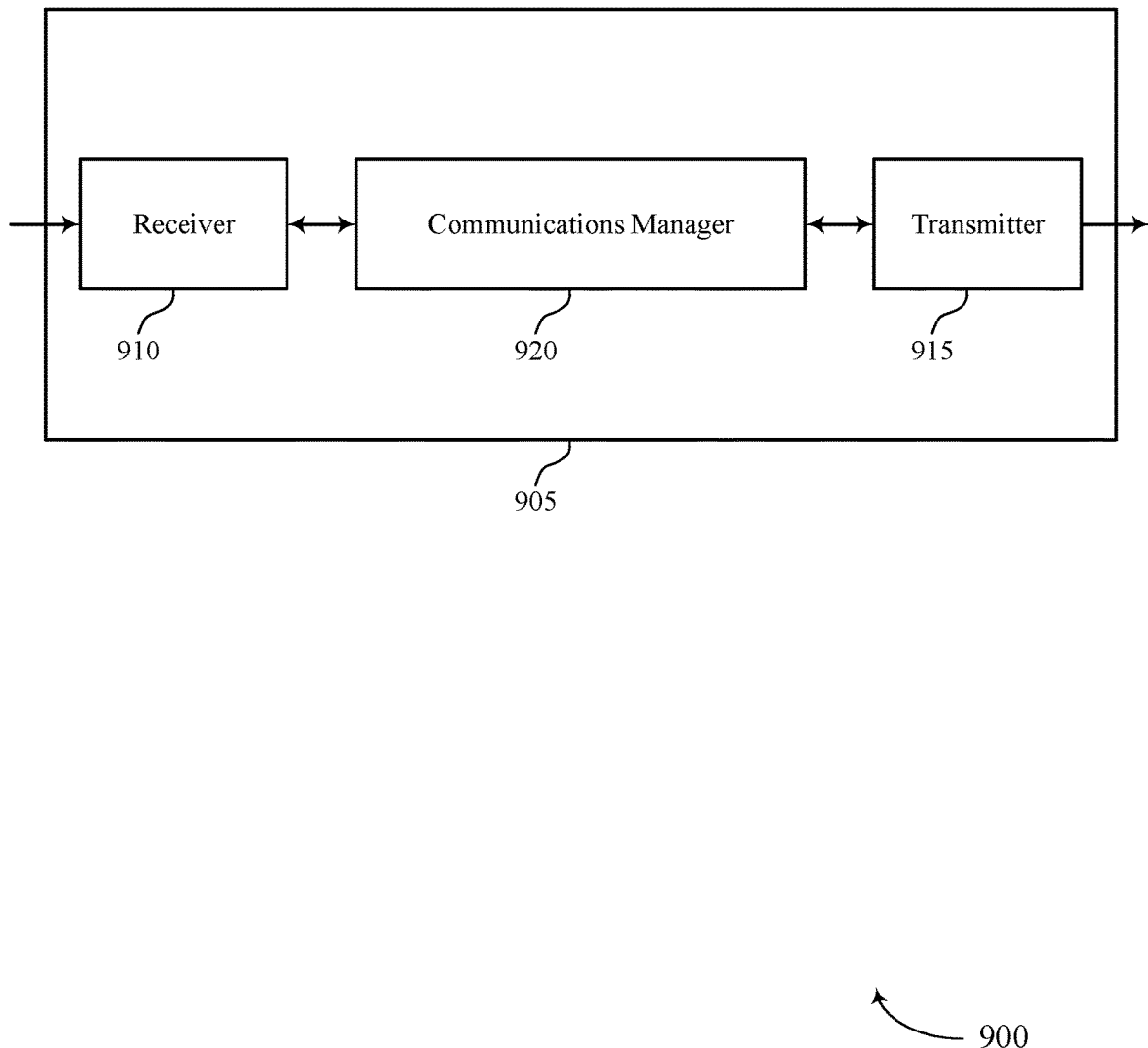
FIGS. 9 and 10 show block diagrams of devices that support uplink reference signal transmissions during power saving operations in accordance with aspects of the present disclosure.

FIG. 9 shows a block diagram 900 of a device 905 that supports uplink reference signal transmissions during power saving operations in accordance with aspects of the present disclosure. The device 905 may be an example of aspects of a base station 105 as described herein. The device 905 may include a receiver 910, a transmitter 915, and a communications manager 920. The device 905 may also include at least one processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink reference signal transmissions during power saving operations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink reference signal transmissions during power saving operations). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of uplink reference signal transmissions during power saving operations as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include at least one processor, a DSP, an ASIC, an FPGA or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 920, the receiver 910, the transmitter 915, or various combinations or components thereof may be implemented in code (e.g., as communications management software) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for configuring a UE for discontinuous reception operation with wakeup signal monitoring, where an active duration of a discontinuous reception cycle is initiated at the UE based on detection of a wakeup indication for the UE during the wakeup signal monitoring occasion that is transmitted by the base station. The communications manager 920 may be configured as or otherwise support a means for receiving, in an absence of the wakeup indication being transmitted to the UE during the wakeup signal monitoring occasion, an uplink reference signal from the UE during a first time duration that is outside of the active duration of a first discontinuous reception cycle, where one or more parameters for communications with the UE are determined based on the uplink reference signal.

By including or configuring the communications manager 920 in accordance with examples as described herein, the device 905 (e.g., at least one processor controlling or otherwise coupled to the receiver 910, the transmitter 915, the communications manager 920, or a combination thereof) may support techniques for uplink reference signal transmission outside of a DRX active time, that may reduce power consumption, decrease latency, and improve the reliability of the communications.

Figure 10:
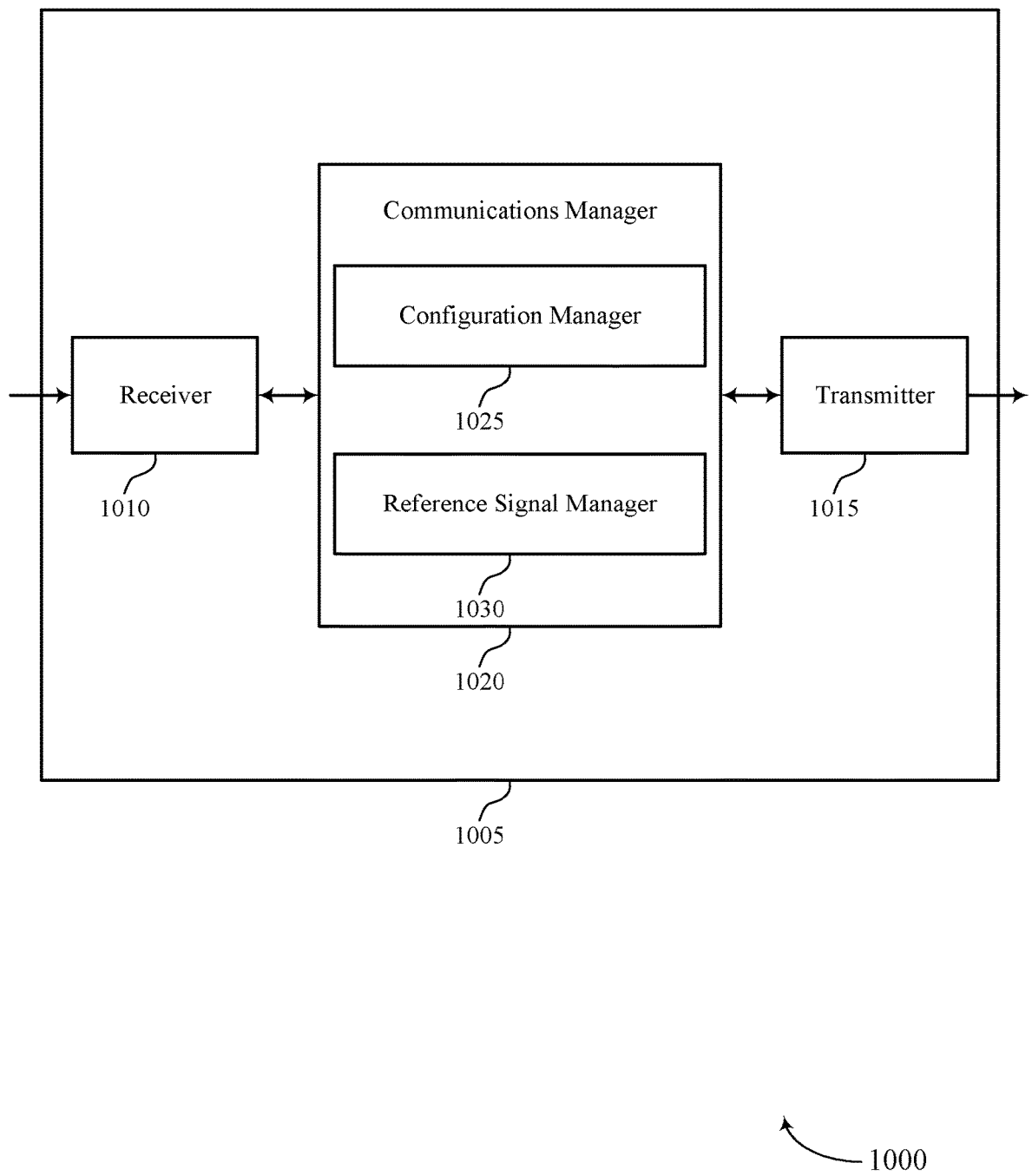

FIG. 10 shows a block diagram 1000 of a device 1005 that supports uplink reference signal transmissions during power saving operations in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include at least one processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to uplink reference signal transmissions during power saving operations). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to uplink reference signal transmissions during power saving operations). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of uplink reference signal transmissions during power saving operations as described herein. For example, the communications manager 1020 may include a configuration manager 1025 a reference signal manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The configuration manager 1025 may be configured as or otherwise support a means for configuring a UE for discontinuous reception operation with wakeup signal monitoring, where an active duration of a discontinuous reception cycle is initiated at the UE based on detection of a wakeup indication for the UE during the wakeup signal monitoring occasion that is transmitted by the base station. The reference signal manager 1030 may be configured as or otherwise support a means for receiving, in an absence of the wakeup indication being transmitted to the UE during the wakeup signal monitoring occasion, an uplink reference signal from the UE during a first time duration that is outside of the active duration of a first discontinuous reception cycle, where one or more parameters for communications with the UE are determined based on the uplink reference signal.

Figure 11:
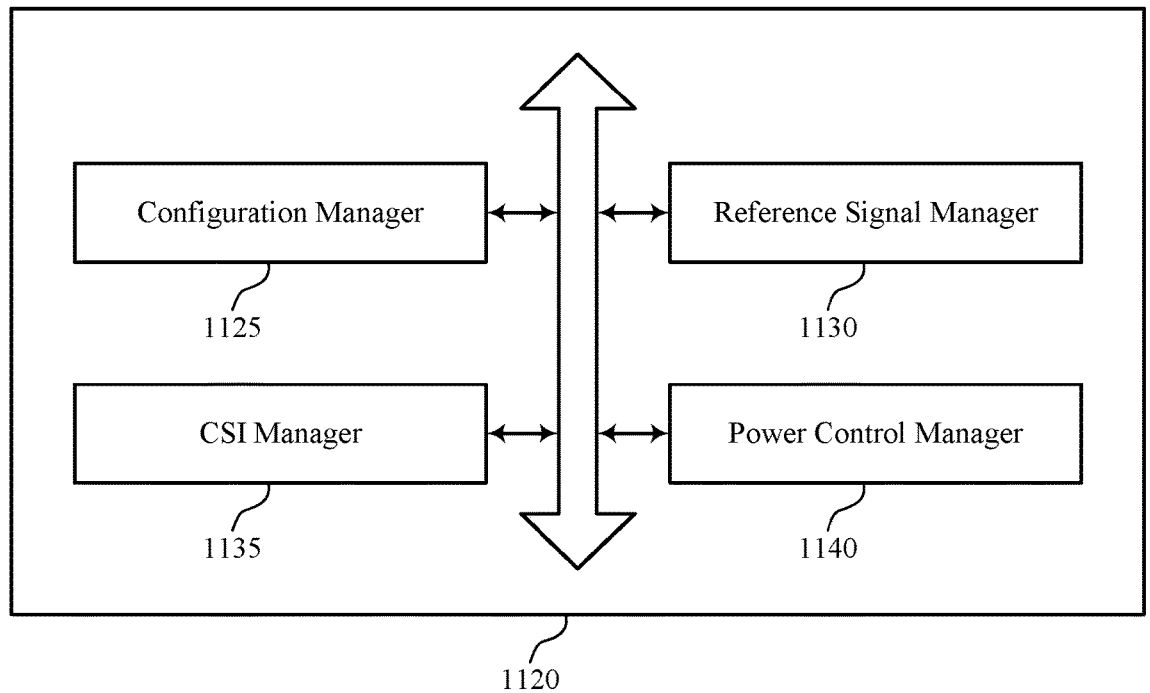
FIG. 11 shows a block diagram of a communications manager that supports uplink reference signal transmissions during power saving operations in accordance with aspects of the present disclosure.

FIG. 11 shows a block diagram 1100 of a communications manager 1120 that supports uplink reference signal transmissions during power saving operations in accordance with aspects of the present disclosure. The communications manager 1120 may be an example of aspects of a communications manager 920, a communications manager 1020, or both, as described herein. The communications manager 1120, or various components thereof, may be an example of means for performing various aspects of uplink reference signal transmissions during power saving operations as described herein. For example, the communications manager 1120 may include a configuration manager 1125, a reference signal manager 1130, a CSI manager 1135, a power control manager 1140, or any combination thereof. Each of these components may communicate, directly or indirectly, with one another (e.g., via one or more buses).

The communications manager 1120 may support wireless communication at a base station in accordance with examples as disclosed herein. The configuration manager

1125 may be configured as or otherwise support a means for configuring a UE for discontinuous reception operation with wakeup signal monitoring, where an active duration of a discontinuous reception cycle is initiated at the UE based on detection of a wakeup indication for the UE during the wakeup signal monitoring occasion that is transmitted by the base station. The reference signal manager 1130 may be configured as or otherwise support a means for receiving, in an absence of the wakeup indication being transmitted to the UE during the wakeup signal monitoring occasion, an uplink reference signal from the UE during a first time duration that is outside of the active duration of a first discontinuous reception cycle, where one or more parameters for communications with the UE are determined based on the uplink reference signal.

In some examples, to support configuring, the reference signal manager 1130 may be configured as or otherwise support a means for configuring a set of multiple uplink reference signal resources for transmission of a set of multiple uplink reference signals, and where the receiving the uplink reference signal includes receiving one or more uplink reference signals on a subset of the set of multiple uplink reference signal resources. In some examples, the configuration information provides uplink reference signal resources for uplink reference signal transmissions within the active duration and provides separately configured uplink reference signal resources for uplink reference signal transmissions outside of the active duration. In some examples, the receiving the uplink reference signal is based on a type of reference signal resource of the set of multiple uplink reference signal resources that is present in the first time duration. In some examples, the type of reference signal resource includes one or more of a periodic SRS resource, a semi-persistent SRS resource, an aperiodic SRS resource, SRS resources with periodicity larger than a threshold value, SRS resources configured with one or more usages, or any combinations thereof.

In some examples, the CSI manager 1135 may be configured as or otherwise support a means for receiving, in the absence of the wakeup indication being transmitted to the UE, a CSI report during the first time duration that is outside of the active duration of the first discontinuous reception cycle. In some examples, the uplink reference signal during the first time duration that is outside of the active duration of the first discontinuous reception cycle has one or more transmission parameters that are different than transmission parameters of uplink reference signals transmitted within active durations of one or more discontinuous reception cycles. In some examples, the one or more transmission parameters include one or more of a reference signal periodicity, number of antenna ports for reference signal transmission, a transmission power, a timing advance value, a set of time and frequency resources, or any combinations thereof, and where the one or more transmission parameters are determined based on a separate configuration or a predetermined rule associated with uplink reference signal transmissions during the first time duration. In some examples, the first time duration corresponds to a time duration of a discontinuous reception on-duration timer, a configured number of uplink reference signal transmission periods, or to a time duration that is different from the time duration of the discontinuous reception on-duration timer.

In some examples, the power control manager 1140 may be configured as or otherwise support a means for transmitting, after the receiving the uplink reference signal, a downlink control channel transmission to the UE during a second time duration. In some examples, the downlink control channel transmission provides a transmit power control command for the UE that is based on the uplink reference signal. In some examples, the second time duration is a configured duration of time after the uplink reference signal transmission, a predetermined duration of time after the uplink reference signal transmission, a remaining duration of time until an end of the first time duration, or a zero-duration period that indicates no monitoring for the downlink control channel transmission.

In some examples, the configuration manager 1125 may be configured as or otherwise support a means for receiving, from the UE, a capability indication that indicates that the UE is capable for uplink reference signal transmissions outside of active durations of discontinuous reception cycles.

Figure 12:
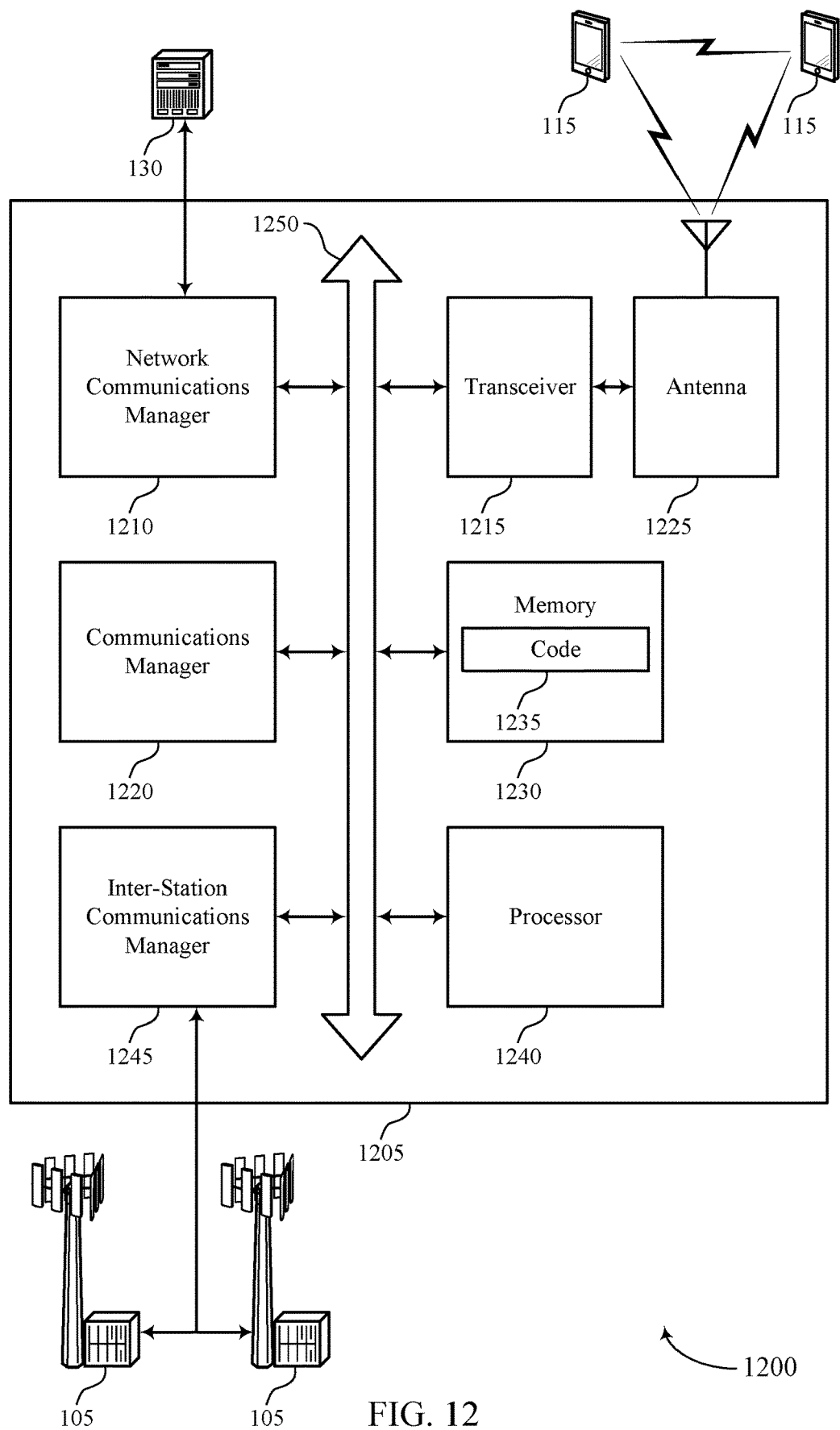
FIG. 12 shows a diagram of a system including a device that supports uplink reference signal transmissions during power saving operations in accordance with aspects of the present disclosure.

FIG. 12 shows a diagram of a system 1200 including a device 1205 that supports uplink reference signal transmissions during power saving operations in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting uplink reference signal transmissions during power saving operations). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for configuring a UE for discontinuous reception operation with wakeup signal monitoring, where an active duration of a discontinuous reception cycle is initiated at the UE based on detection of a wakeup indication for the UE during the wakeup signal monitoring occasion that is transmitted by the base station. The communications manager 1220 may be configured as or otherwise support a means for receiving, in an absence of the wakeup indication being transmitted to the UE during the wakeup signal monitoring occasion, an uplink reference signal from the UE during a first time duration that is outside of the active duration of a first discontinuous reception cycle, where one or more parameters for communications with the UE are determined based on the uplink reference signal.

By including or configuring the communications manager 1220 in accordance with examples as described herein, the device 1205 may support techniques for uplink reference signal transmission outside of a DRX active time, that may reduce power consumption, decrease latency, improve the reliability of the communications, and improve user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of uplink reference signal transmissions during power saving operations as described herein, or the processor 1240 and the memory 1230 may be otherwise configured to perform or support such operations.

Figure 13:
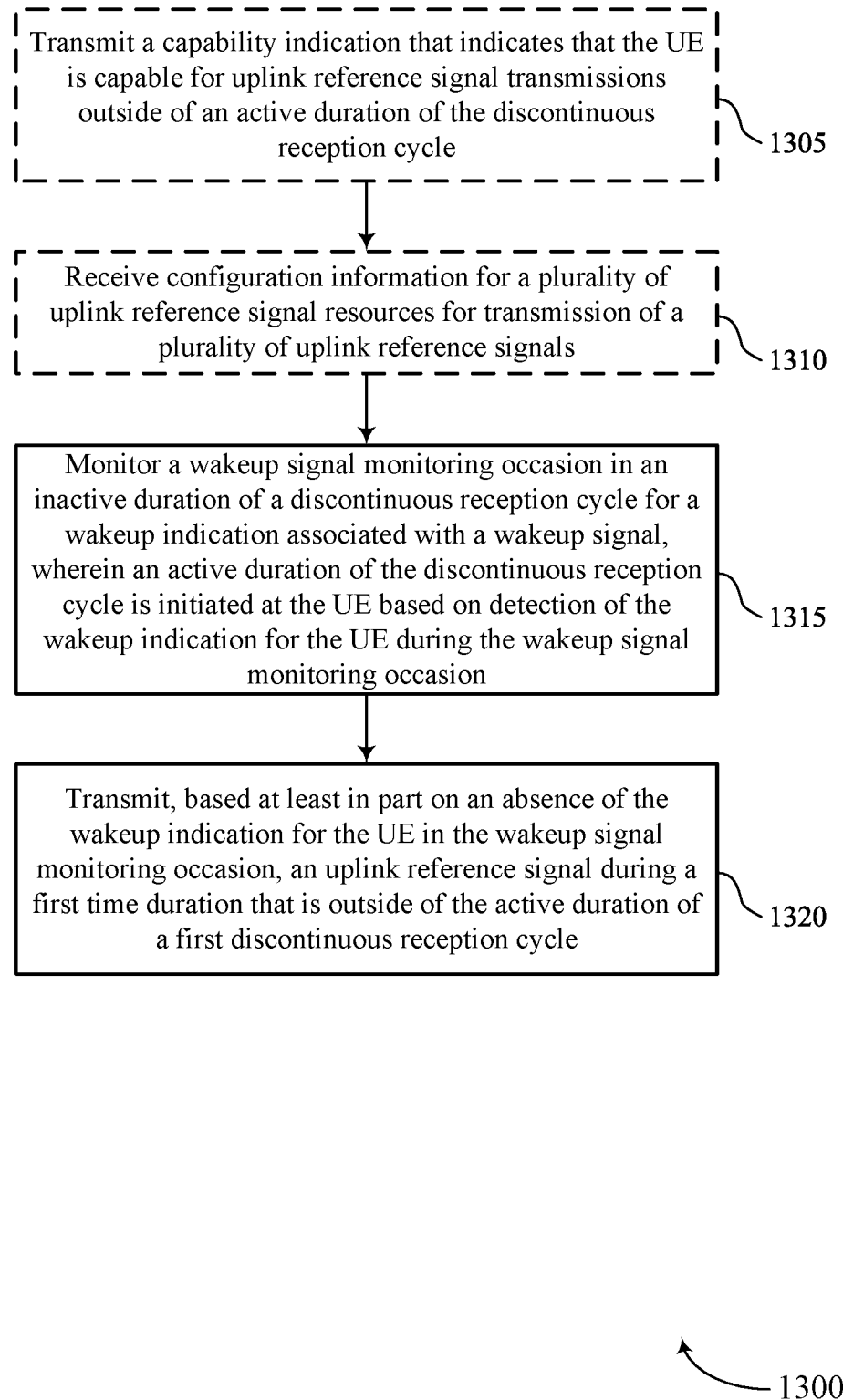
FIGS. 13 through 18 show flowcharts illustrating methods that support uplink reference signal transmissions during power saving operations in accordance with aspects of the present disclosure.

FIG. 13 shows a flowchart illustrating a method 1300 that supports uplink reference signal transmissions during power saving operations in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

Optionally, at 1305, the method may include transmitting a capability indication that indicates that the UE is capable for uplink reference signal transmissions outside of the active duration of a discontinuous reception cycle. The operations of 1305 may be performed in accordance with examples as disclosed herein. In some examples, aspects of the operations of 1305 may be performed by a configuration manager 735 as described with reference to FIG. 7.

Optionally, at 1310, the method may include receiving configuration information for a set of multiple uplink reference signal resources for transmission of a set of multiple uplink reference signals. The operations of 1310 may be performed in accordance with examples as disclosed herein. In some examples, aspects of the operations of 1310 may be performed by a configuration manager 735 as described with reference to FIG. 7.

At 1315, the method may include monitoring a wakeup signal monitoring occasion in an inactive duration of a discontinuous reception cycle for a wakeup indication associated with a wakeup signal, where an active duration of the discontinuous reception cycle is initiated at the UE based on detection of the wakeup indication for the UE during the wakeup signal monitoring occasion. The operations of 1315 may be performed in accordance with examples as disclosed herein. In some examples, aspects of the operations of 1315 may be performed by a wakeup manager 725 as described with reference to FIG. 7.

At 1320, the method may include transmitting, based on an absence of the wakeup signal indicator for the UE in the wakeup signal monitoring occasion, an uplink reference signal during a first time duration that is outside of the active duration of a first discontinuous reception cycle. The operations of 1320 may be performed in accordance with examples as disclosed herein. In some examples, aspects of the operations of 1320 may be performed by a reference signal manager 730 as described with reference to FIG. 7. In some cases, the transmitting the uplink reference signal includes transmitting one or more uplink reference signals on a subset of the set of multiple uplink reference signal resources.

Figure 14:
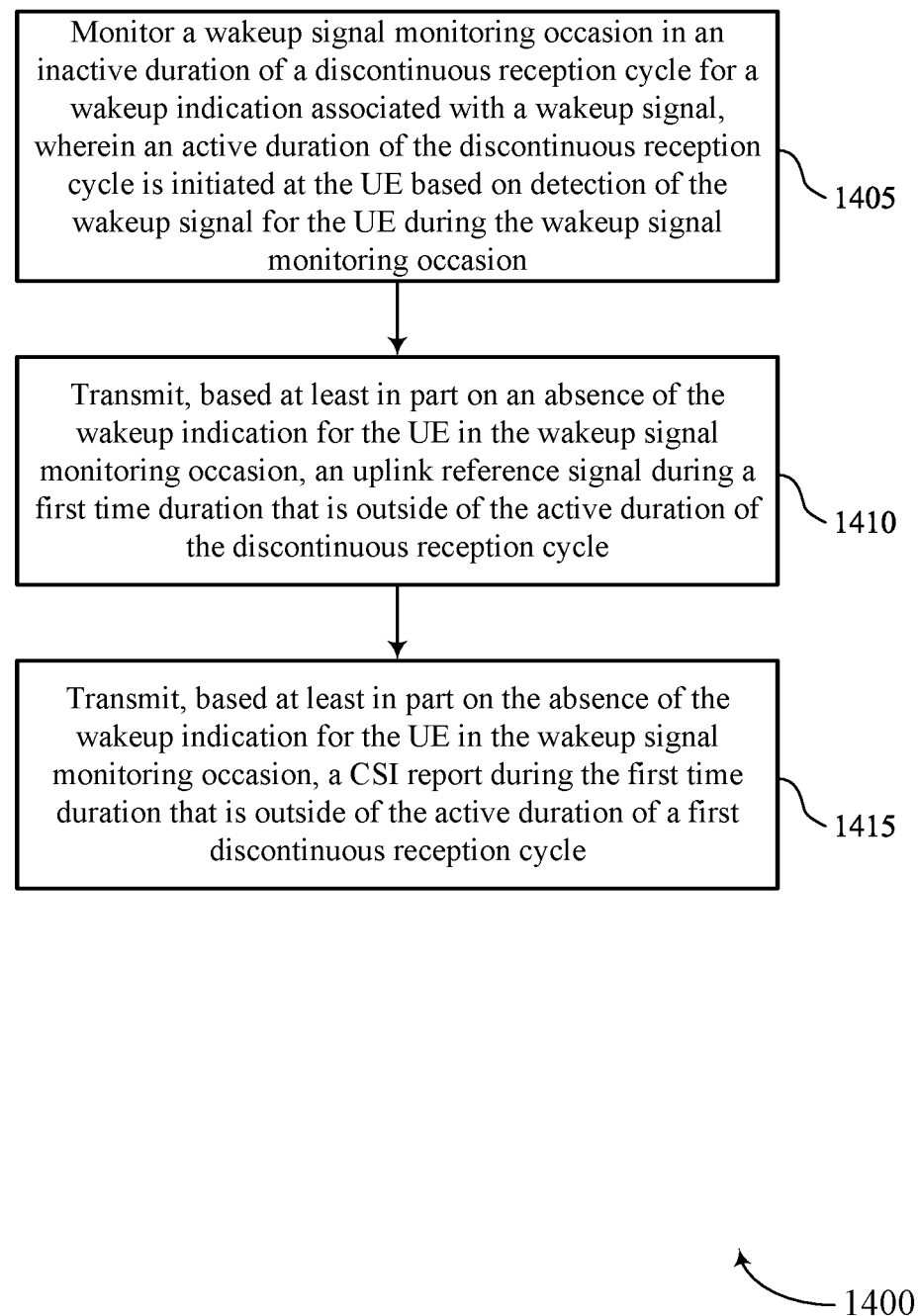

FIG. 14 shows a flowchart illustrating a method 1400 that supports uplink reference signal transmissions during power saving operations in accordance with aspects of the present disclosure. The operations of the method 1400 may be implemented by a UE or its components as described herein. For example, the operations of the method 1400 may be performed by a UE 115 as described with reference to FIGS.

1 through 8. In some examples, a UE may execute a set of instructions to control the functional elements of the UE to perform the described functions. Additionally or alternatively, the UE may perform aspects of the described functions using special-purpose hardware.

At 1405, the method may include monitoring a wakeup signal monitoring occasion in an inactive duration of a discontinuous reception cycle for a wakeup indication associated with a wakeup signal, where an active duration of the discontinuous reception cycle is initiated at the UE based on detection of the wakeup indication for the UE during the wakeup signal monitoring occasion. The operations of 1405 may be performed in accordance with examples as disclosed herein. In some examples, aspects of the operations of 1405 may be performed by a wakeup manager 725 as described with reference to FIG. 7.

At 1410, the method may include transmitting, based on an absence of the wakeup signal indicator for the UE in the wakeup signal monitoring occasion, an uplink reference signal during a first time duration that is outside of the active duration of a first discontinuous reception cycle. The operations of 1410 may be performed in accordance with examples as disclosed herein. In some examples, aspects of the operations of 1410 may be performed by a reference signal manager 730 as described with reference to FIG. 7.

At 1415, the method may include transmitting, based on the absence of the wakeup indication for the UE in the wakeup signal monitoring occasion, a CSI report during the first time duration that is outside of the active duration of the first discontinuous reception cycle. The operations of 1415 may be performed in accordance with examples as disclosed herein. In some examples, aspects of the operations of 1415 may be performed by a CSI report manager 740 as described with reference to FIG. 7.

Figure 15:
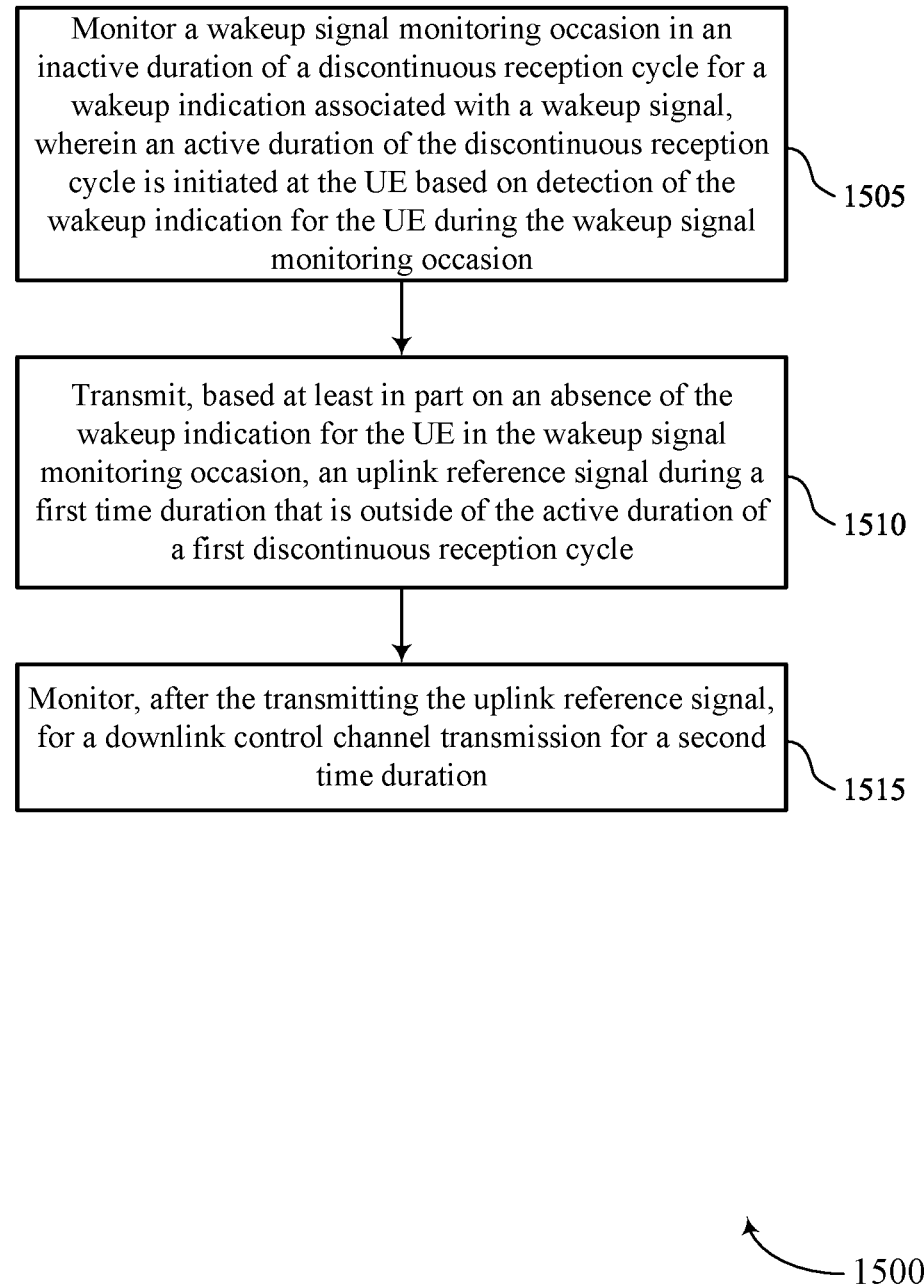

FIG. 15 shows a flowchart illustrating a method 1500 that supports uplink reference signal transmissions during power saving operations in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include monitoring a wakeup signal monitoring occasion in an inactive duration of a discontinuous reception cycle for a wakeup indication associated with a wakeup signal, where an active duration of the discontinuous reception cycle is initiated at the UE based on detection of the wakeup indication for the UE during the wakeup signal monitoring occasion. The operations of 1505 may be performed in accordance with examples as disclosed herein. In some examples, aspects of the operations of 1505 may be performed by a wakeup manager 725 as described with reference to FIG. 7.

At 1510, the method may include transmitting, based on an absence of the wakeup signal indicator for the UE in the wakeup signal monitoring occasion, an uplink reference signal during a first time duration that is outside of the active duration of a first discontinuous reception cycle. The operations of 1510 may be performed in accordance with examples as disclosed herein. In some examples, aspects of the operations of 1510 may be performed by a reference signal manager 730 as described with reference to FIG. 7.

At 1515, the method may include monitoring, after the transmitting the uplink reference signal, for a downlink control channel transmission for a second time duration. The operations of 1515 may be performed in accordance with examples as disclosed herein. In some examples, aspects of the operations of 1515 may be performed by a power control manager 745 as described with reference to FIG. 7.

Figure 16:
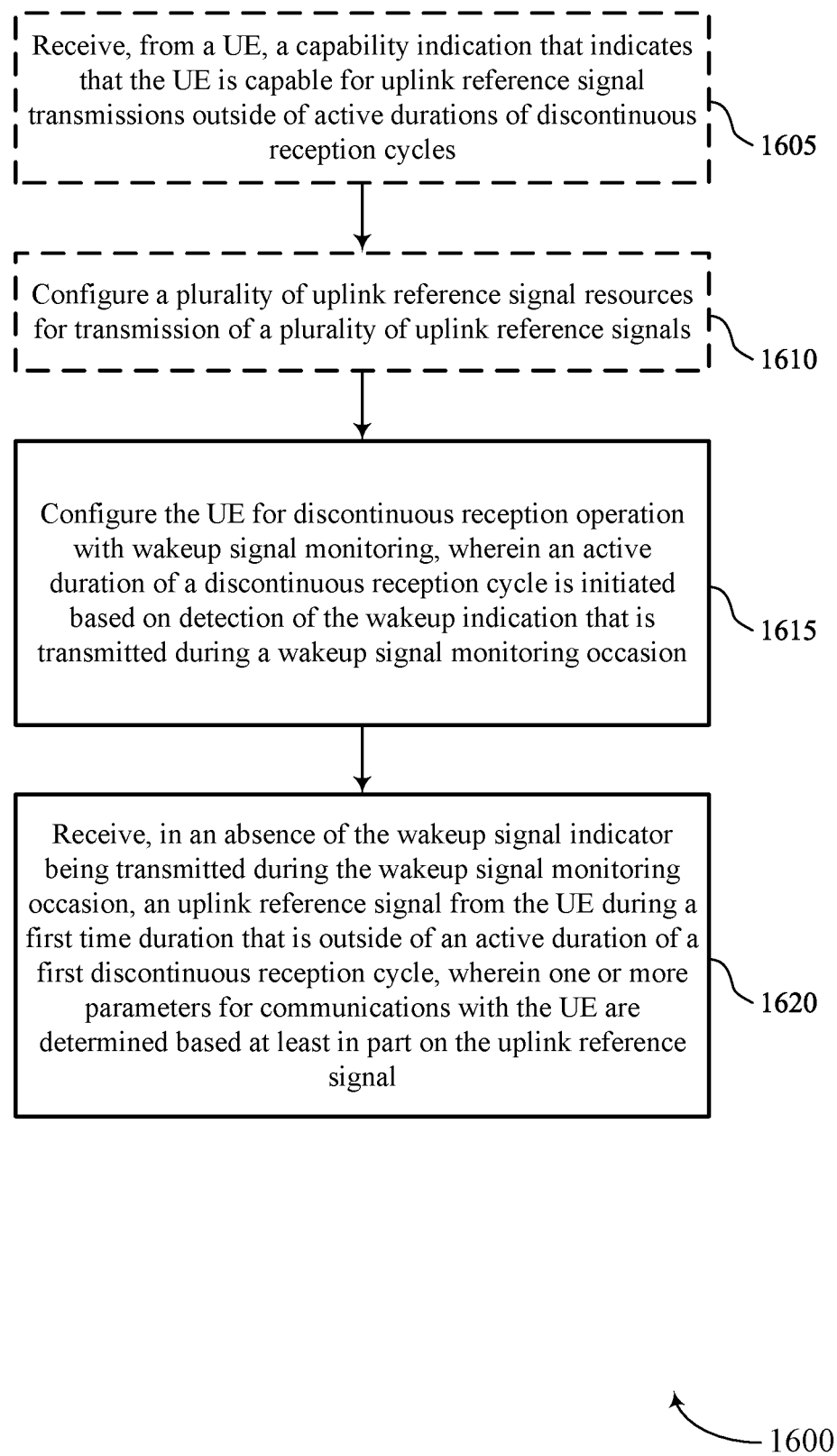

FIG. 16 shows a flowchart illustrating a method 1600 that supports uplink reference signal transmissions during power saving operations in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

Optionally, at 1605, the method may include receiving, from a UE, a capability indication that indicates that the UE is capable for uplink reference signal transmissions outside of active durations of discontinuous reception cycles. The operations of 1605 may be performed in accordance with examples as disclosed herein. In some examples, aspects of the operations of 1605 may be performed by a configuration manager 1125 as described with reference to FIG. 11.

Optionally, at 1610, the method may include configuring a set of multiple uplink reference signal resources for transmission of a set of multiple uplink reference signals. The operations of 1610 may be performed in accordance with examples as disclosed herein. In some examples, aspects of the operations of 1610 may be performed by a reference signal manager 1130 as described with reference to FIG. 11.

At 1615, the method may include configuring the UE for discontinuous reception operation with wakeup signal monitoring, where an active duration of a discontinuous reception cycle is initiated based on detection of a wakeup indication that is transmitted during the wakeup signal monitoring occasion. The operations of 1615 may be performed in accordance with examples as disclosed herein. In some examples, aspects of the operations of 1615 may be performed by a configuration manager 1125 as described with reference to FIG. 11.

At 1620, the method may include receiving, in an absence of the wakeup indication being transmitted to the UE during the wakeup signal monitoring occasion, an uplink reference signal from the UE during a first time duration that is outside of an active duration of a first discontinuous reception cycle, where one or more parameters for communications with the UE are determined based on the uplink reference signal. The operations of 1620 may be performed in accordance with examples as disclosed herein. In some examples, aspects of the operations of 1620 may be performed by a reference signal manager 1130 as described with reference to FIG. 11. In some cases, the receiving the uplink reference signal includes receiving one or more uplink reference signals on a subset of the set of multiple uplink reference signal resources.

Figure 17:
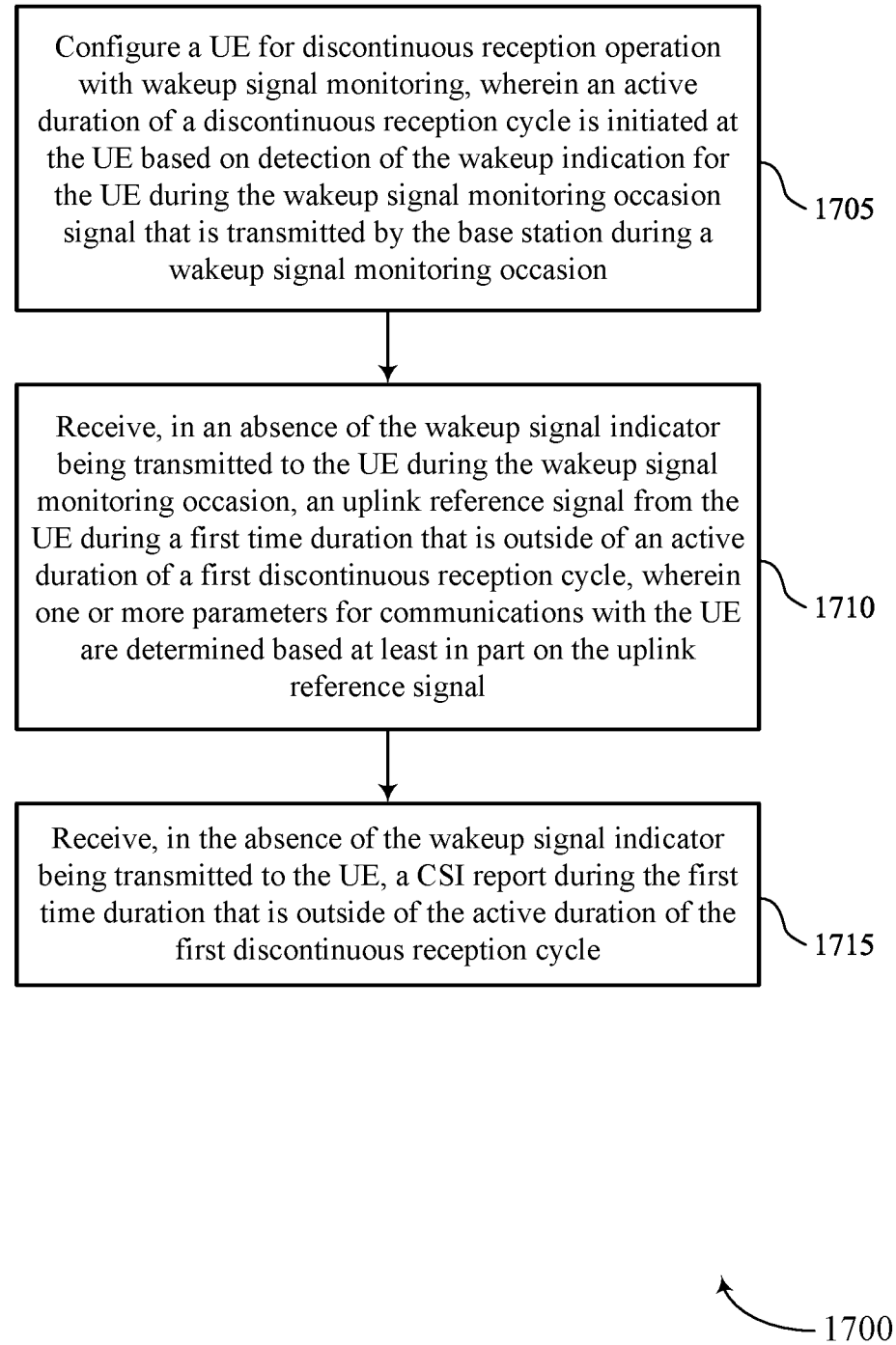

FIG. 17 shows a flowchart illustrating a method 1700 that supports uplink reference signal transmissions during power saving operations in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include configuring a UE for discontinuous reception operation with wakeup signal monitoring, where an active duration of a discontinuous reception cycle is initiated at the UE based on detection of a wakeup indication for the UE during the wakeup signal monitoring occasion that is transmitted by the base station. The operations of 1705 may be performed in accordance with examples as disclosed herein. In some examples, aspects of the operations of 1705 may be performed by a configuration manager 1125 as described with reference to FIG. 11.

At 1710, the method may include receiving, in an absence of the wakeup indication being transmitted to the UE during the wakeup signal monitoring occasion, an uplink reference signal from the UE during a first time duration that is outside of an active duration of a first discontinuous reception cycle, where one or more parameters for communications with the UE are determined based on the uplink reference signal. The operations of 1710 may be performed in accordance with examples as disclosed herein. In some examples, aspects of the operations of 1710 may be performed by a reference signal manager 1130 as described with reference to FIG. 11.

At 1715, the method may include receiving, in the absence of the wakeup indication being transmitted to the UE, a CSI report during the first time duration that is outside of the active duration of the first discontinuous reception cycle. The operations of 1715 may be performed in accordance with examples as disclosed herein. In some examples, aspects of the operations of 1715 may be performed by a CSI manager 1135 as described with reference to FIG. 11.

Figure 18:
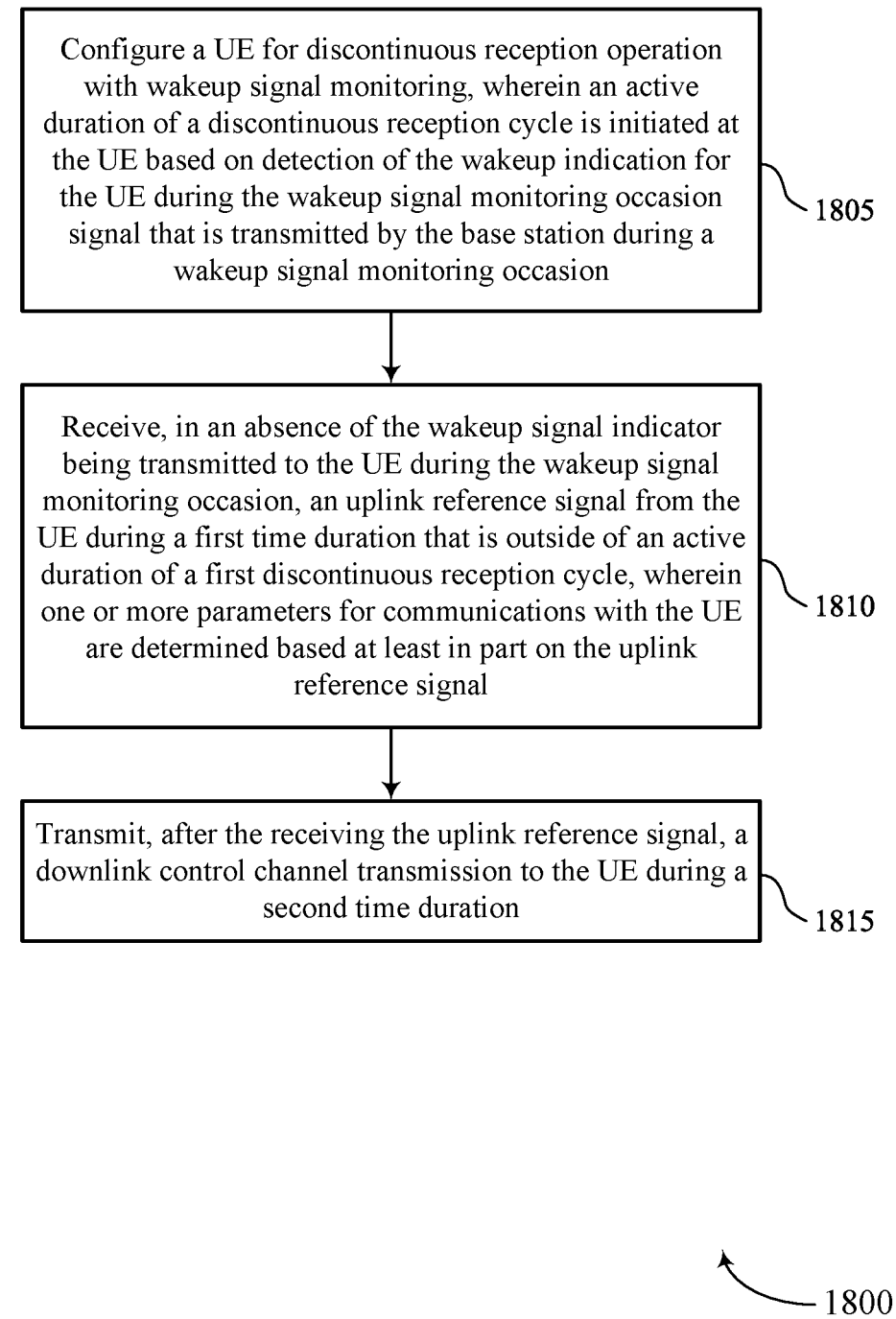

FIG. 18 shows a flowchart illustrating a method 1800 that supports uplink reference signal transmissions during power saving operations in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include configuring a UE for discontinuous reception operation with wakeup signal monitoring, where an active duration of a discontinuous reception cycle is initiated at the UE based on detection of a wakeup indication for the UE during the wakeup signal monitoring occasion that is transmitted by the base station. The operations of 1805 may be performed in accordance with examples as disclosed herein. In some examples, aspects of the operations of 1805 may be performed by a configuration manager 1125 as described with reference to FIG. 11.

At 1810, the method may include receiving, in an absence of the wakeup indication being transmitted to the UE during the wakeup signal monitoring occasion, an uplink reference signal from the UE during a first time duration that is outside of an active duration of a first discontinuous reception cycle, where one or more parameters for communications with the UE are determined based on the uplink reference signal. The operations of 1810 may be performed in accordance with examples as disclosed herein. In some examples, aspects of the operations of 1810 may be performed by a reference signal manager 1130 as described with reference to FIG. 11.

At 1815, the method may include transmitting, after the receiving the uplink reference signal, a downlink control channel transmission to the UE during a second time duration. The operations of 1815 may be performed in accordance with examples as disclosed herein. In some examples, aspects of the operations of 1815 may be performed by a power control manager 1140 as described with reference to FIG. 11.

The following provides an overview of aspects of the present disclosure:

Aspect 1: A method for wireless communication at a UE, comprising: monitoring a wakeup signal monitoring occasion in an inactive duration of a discontinuous reception cycle for a wakeup indication associated with a wakeup signal, wherein an active duration of the discontinuous reception cycle is initiated at the UE based on detection of the wakeup indication for the UE during the wakeup signal monitoring occasion; and transmitting, based at least in part on an absence of the wakeup signal indicator for the UE in the wakeup signal monitoring occasion, an uplink reference signal during a first time duration that is outside of the active duration of a first discontinuous reception cycle.

Aspect 2: The method of aspect 1, further comprising: receiving configuration information for a plurality of uplink reference signal resources for transmission of a plurality of uplink reference signals, and wherein the transmitting the uplink reference signal includes transmitting one or more uplink reference signals on a subset of the plurality of uplink reference signal resources.

Aspect 3: The method of aspect 2, wherein the configuration information provides uplink reference signal resources for uplink reference signal transmissions within the active duration and provides separately configured uplink reference signal resources for uplink reference signal transmissions outside of the active duration.

Aspect 4: The method of any of aspects 2 through 3, wherein the transmitting the uplink reference signal is based at least in part on a type of reference signal resource of the plurality of uplink reference signal resources that is present in the first time duration.

Aspect 5: The method of aspect 4, wherein the type of reference signal resource includes one or more of a periodic SRS resource, a semi-persistent SRS resource, an aperiodic SRS resource, SRS resources with periodicity larger than a threshold value, SRS resources configured with one or more usages, or any combinations thereof.

Aspect 6: The method of any of aspects 1 through 5, further comprising: transmitting, based at least in part on the absence of the wakeup indication for the UE in the wakeup signal monitoring occasion, a CSI report during the first time duration that is outside of the active duration of the first discontinuous reception cycle.

Aspect 7: The method of any of aspects 1 through 6, wherein the uplink reference signal during the first time duration that is outside of the active duration of the first discontinuous reception cycle has one or more transmission parameters that are different than transmission parameters of uplink reference signals transmitted within the active duration of the discontinuous reception cycle.

Aspect 8: The method of aspect 7, wherein the one or more transmission parameters include one or more of a reference signal periodicity, number of antenna ports for reference signal transmission, a transmission power, a timing advance value, a set of time and frequency resources, or any combinations thereof, and wherein the one or more transmission parameters are determined based at least in part on a separate configuration or a predetermined rule associated with uplink reference signal transmissions during the first time duration that is outside of the active duration of the first discontinuous reception cycle.

Aspect 9: The method of any of aspects 1 through 8, wherein the first time duration corresponds to a time duration that of a discontinuous reception on-duration timer, a configured number of uplink reference signal transmission periods, or to a time duration that is different from the time duration of the discontinuous reception on-duration timer.

Aspect 10: The method of any of aspects 1 through 9, further comprising: monitoring, after the transmitting the uplink reference signal, for a downlink control channel transmission for a second time duration.

Aspect 11: The method of aspect 10, wherein the downlink control channel transmission provides a transmit power control command for the UE that is based at least in part on the uplink reference signal.

Aspect 12: The method of any of aspects 10 through 11, wherein the second time duration is a configured duration of time after the uplink reference signal transmission, a predetermined duration of time after the uplink reference signal transmission, a remaining duration of time until an end of the first time duration, or a zero-duration period that indicates no monitoring for the downlink control channel transmission.

Aspect 13: The method of any of aspects 1 through 12, further comprising: transmitting a capability indication that indicates that the UE is capable for uplink reference signal transmissions outside of the active duration of the discontinuous reception cycle.

Aspect 14: A method for wireless communication at an access network entity, comprising: configuring a UE for discontinuous reception operation with wakeup signal monitoring, wherein an active duration of a discontinuous reception cycle is initiated based at least in part on detection of a wakeup indication that is transmitted during the wakeup signal monitoring occasion; and receiving, in an absence of the wakeup indication being transmitted during the wakeup signal monitoring occasion, an uplink reference signal from the UE during a first time duration that is outside of the active duration of a first discontinuous reception cycle, wherein one or more parameters for communications with the UE are determined based at least in part on the uplink reference signal.

Aspect 15: The method of aspect 14, wherein the configuring further comprises: configuring a plurality of uplink reference signal resources for transmission of a plurality of uplink reference signals, and wherein the receiving the uplink reference signal includes receiving one or more uplink reference signals on a subset of the plurality of uplink reference signal resources.

Aspect 16: The method of aspect 15, wherein the configuration information provides uplink reference signal resources for uplink reference signal transmissions within the active duration and provides separately configured uplink reference signal resources for uplink reference signal transmissions outside of the active duration.

Aspect 17: The method of any of aspects 15 through 16, wherein the receiving the uplink reference signal is based at least in part on a type of reference signal resource of the plurality of uplink reference signal resources that is present in the first time duration.

Aspect 18: The method of aspect 17, wherein the type of reference signal resource includes one or more of a periodic SRS resource, a semi-persistent SRS resource, an aperiodic SRS resource, SRS resources with periodicity larger than a threshold value, SRS resources configured with one or more usages, or any combinations thereof.

Aspect 19: The method of any of aspects 14 through 18, further comprising: receiving, in the absence of the wakeup indication being transmitted to the UE, a CSI report during the first time duration that is outside of the active duration of the first discontinuous reception cycle.

Aspect 20: The method of any of aspects 14 through 19, wherein the uplink reference signal during the first time duration that is outside of the active duration of the first discontinuous reception cycle has one or more transmission parameters that are different than transmission parameters of uplink reference signals transmitted within active durations of one or more discontinuous reception cycles.

Aspect 21: The method of aspect 20, wherein the one or more transmission parameters include one or more of a reference signal periodicity, number of antenna ports for reference signal transmission, a transmission power, a timing advance value, a set of time and frequency resources, or any combinations thereof, and wherein the one or more transmission parameters are determined based at least in part on a separate configuration or a predetermined rule associated with uplink reference signal transmissions during the first time duration.

Aspect 22: The method of any of aspects 14 through 21, wherein the first time duration corresponds to a time duration of a discontinuous reception on-duration timer, a configured number of uplink reference signal transmission periods, or to a time duration that is different from the time duration of the discontinuous reception on-duration timer.

Aspect 23: The method of any of aspects 14 through 22, further comprising: transmitting, after the receiving the uplink reference signal, a downlink control channel transmission to the UE during a second time duration.

Aspect 24: The method of aspect 23, wherein the downlink control channel transmission provides a transmit power control command for the UE that is based at least in part on the uplink reference signal.

Aspect 25: The method of any of aspects 23 through 24, wherein the second time duration is a configured duration of time after the uplink reference signal transmission, a predetermined duration of time after the uplink reference signal transmission, a remaining duration of time until an end of the first time duration, or a zero-duration period that indicates no monitoring for the downlink control channel transmission.

Aspect 26: The method of any of aspects 14 through 25, further comprising: receiving, from the UE, a capability indication that indicates that the UE is capable for uplink reference signal transmissions outside of active durations of discontinuous reception cycles.

Aspect 27: An apparatus for wireless communication at a UE, comprising at least one processor; memory coupled with the at least one processor; and instructions stored in the memory and executable by the at least one processor to cause the UE to perform a method of any of aspects 1 through 13.

Aspect 28: An apparatus for wireless communication at a UE, comprising at least one means for performing a method of any of aspects 1 through 13.

Aspect 29: A non-transitory computer-readable medium storing code for wireless communication at a UE, the code comprising instructions executable by at least one processor to perform a method of any of aspects 1 through 13.

Aspect 30: An apparatus for wireless communication at an access network entity, comprising at least one processor; memory coupled with the at least one processor; and instructions stored in the memory and executable by the at least one processor to cause the access network entity to perform a method of any of aspects 14 through 26.

Aspect 31: An apparatus for wireless communication at an access network entity, comprising at least one means for performing a method of any of aspects 14 through 26.

Aspect 32: A non-transitory computer-readable medium storing code for wireless communication at an access network entity, the code comprising instructions executable by at least one processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting a capability indication that indicates that the UE is capable of uplink reference signal transmissions outside of an active duration of a discontinuous reception cycle;
   monitoring a wakeup signal monitoring occasion in an inactive duration of the discontinuous reception cycle for a wakeup indication associated with a wakeup signal, wherein the active duration of the discontinuous reception cycle is initiated at the UE based at least in part on detection of the wakeup indication for the UE during the wakeup signal monitoring occasion; and
   transmitting, based at least in part on an absence of the wakeup indication for the UE in the wakeup signal monitoring occasion, an uplink reference signal during a first time duration that is outside of an active duration of a first discontinuous reception cycle.

2. The method of claim 1, further comprising:
   receiving configuration information for a plurality of uplink reference signal resources for transmission of a plurality of uplink reference signals, and wherein the transmitting the uplink reference signal includes transmitting one or more uplink reference signals using a subset of the plurality of uplink reference signal resources.

3. The method of claim 2, wherein the configuration information provides uplink reference signal resources for uplink reference signal transmissions within the active duration and provides separately configured uplink reference signal resources for uplink reference signal transmissions outside of the active duration.

4. The method of claim 2, wherein the transmitting the uplink reference signal is based at least in part on a type of reference signal resource of the plurality of uplink reference signal resources that is present in the first time duration.

5. The method of claim 4, wherein the type of reference signal resource includes one or more of a periodic sounding reference signal (SRS) resource, a semi-persistent SRS resource, an aperiodic SRS resource, SRS resources with periodicity larger than a threshold value, SRS resources configured with one or more usages, or any combinations thereof.

6. The method of claim 1, further comprising:
   transmitting, based at least in part on the absence of the wakeup indication for the UE in the wakeup signal monitoring occasion, a channel state information (CSI) report during the first time duration that is outside of the active duration of the first discontinuous reception cycle.

7. The method of claim 1, wherein the uplink reference signal during the first time duration that is outside of the active duration of the first discontinuous reception cycle has one or more transmission parameters that are different than transmission parameters of uplink reference signals transmitted within the active duration of the first discontinuous reception cycle.

8. The method of claim 7, wherein the one or more transmission parameters include one or more of a reference signal periodicity, number of antenna ports for reference signal transmission, a transmission power, a timing advance value, a set of time and frequency resources, or any combinations thereof, and wherein the one or more transmission parameters are determined based at least in part on a separate configuration or a predetermined rule associated with uplink reference signal transmissions during the first time duration that is outside of the active duration of the first discontinuous reception cycle.

9. The method of claim 1, wherein the first time duration corresponds to a time duration of a discontinuous reception on-duration timer, a configured number of uplink reference signal transmission periods, or to a time duration that is different from the time duration of the discontinuous reception on-duration timer.

10. The method of claim 1, further comprising:
    monitoring, after the transmitting the uplink reference signal, for a downlink control channel transmission for a second time duration.

11. The method of claim 10, wherein the downlink control channel transmission provides a transmit power control command for the UE that is based at least in part on the uplink reference signal.

12. The method of claim 10, wherein the second time duration is a configured duration of time after the uplink reference signal transmission, a predetermined duration of time after the uplink reference signal transmission, a remaining duration of time until an end of the first time duration, or a zero-duration period that indicates no monitoring for the downlink control channel transmission.

13. A method for wireless communication at an access network entity, comprising:
    receiving a capability indication that indicates that a user equipment (UE) is capable of uplink reference signal transmissions outside of an active duration of a discontinuous reception cycle;
    configuring the UE for discontinuous reception operation with wakeup signal monitoring, wherein the active duration of the discontinuous reception cycle is initiated based at least in part on a wakeup indication that is transmitted during a wakeup signal monitoring occasion; and receiving, in an absence of the wakeup indication being transmitted during the wakeup signal monitoring occasion, an uplink reference signal from the UE during a first time duration that is outside of an active duration of a first discontinuous reception cycle, wherein one or more parameters for communications with the UE are determined based at least in part on the uplink reference signal.

14. The method of claim 13, wherein the configuring further comprises:
configuring a plurality of uplink reference signal resources for transmission of a plurality of uplink reference signals, and wherein the receiving the uplink reference signal includes receiving one or more uplink reference signals using a subset of the plurality of uplink reference signal resources.

15. The method of claim 14, wherein the plurality of uplink reference signal resources provide uplink reference signal resources for uplink reference signal transmissions within the active duration and provides separately configured uplink reference signal resources for uplink reference signal transmissions outside of the active duration.

16. The method of claim 14, wherein the receiving the uplink reference signal is based at least in part on a type of reference signal resource of the plurality of uplink reference signal resources that is present in the first time duration.

17. The method of claim 13, further comprising:
receiving, in the absence of the wakeup indication being transmitted to the UE, a channel state information (CSI) report during the first time duration that is outside of the active duration of the first discontinuous reception cycle.

18. The method of claim 13, wherein the uplink reference signal during the first time duration that is outside of the active duration of the first discontinuous reception cycle has one or more transmission parameters that are different than transmission parameters of uplink reference signals transmitted within active durations of one or more discontinuous reception cycles.

19. The method of claim 13, wherein the first time duration corresponds to a time duration of a discontinuous reception on-duration timer, a configured number of uplink reference signal transmission periods, or to a time duration that is different from the time duration of the discontinuous reception on-duration timer.

20. The method of claim 13, further comprising:
transmitting, after the receiving the uplink reference signal, a downlink control channel transmission to the UE during a second time duration, wherein the downlink control channel transmission provides a transmit power control command for the UE that is based at least in part on the uplink reference signal.

21. An apparatus for wireless communication at a user equipment (UE), comprising:
at least one processor;
memory coupled with the at least one processor; and
instructions stored in the memory and executable by the at least one processor to cause the UE to:
transmit a capability indication that indicates that the UE is capable of uplink reference signal transmissions outside of an active duration of a discontinuous reception cycle;

monitor a wakeup signal monitoring occasion in an inactive duration of the discontinuous reception cycle for a wakeup indication associated with a wakeup signal, wherein the active duration of the discontinuous reception cycle is initiated at the UE based at least in part on detection of the wakeup indication for the UE during the wakeup signal monitoring occasion; and transmit, based at least in part on an absence of the wakeup indication for the UE in the wakeup signal monitoring occasion, an uplink reference signal during a first time duration that is outside of an active duration of a first discontinuous reception cycle.

22. The apparatus of claim 21, wherein the instructions are further executable by the at least one processor to cause the UE to:
receive configuration information for a plurality of uplink reference signal resources for transmission of a plurality of uplink reference signals, and
transmit one or more uplink reference signals using a subset of the plurality of uplink reference signal resources.

23. The apparatus of claim 21, wherein the instructions are further executable by the at least one processor to cause the UE to:
transmit, based at least in part on the absence of the wakeup indication for the UE in the wakeup signal monitoring occasion, a channel state information (CSI) report during the first time duration that is outside of the active duration of the first discontinuous reception cycle.

24. The apparatus of claim 21, wherein the uplink reference signal during the first time duration that is outside of the active duration of the first discontinuous reception cycle has one or more transmission parameters that are different than transmission parameters of uplink reference signals transmitted within the active duration of the first discontinuous reception cycle.

25. The apparatus of claim 21, wherein the first time duration corresponds to a time duration of a discontinuous reception on-duration timer, a configured number of uplink reference signal transmission periods, or to a time duration that is different from the time duration of the discontinuous reception on-duration timer.

26. The apparatus of claim 21, wherein the instructions are further executable by the at least one processor to cause the UE to:
monitor, after transmission of the uplink reference signal, for a downlink control channel transmission for a second time duration.

27. An apparatus for wireless communication at an access network entity, comprising:
at least one processor;
memory coupled with the at least one processor; and
instructions stored in the memory and executable by the at least one processor to cause the access network entity to:
receive a capability indication that indicates that a user equipment (UE) is capable of uplink reference signal transmissions outside of an active duration of a discontinuous reception cycle;
configure the UE for discontinuous reception operation with wakeup signal monitoring, wherein the active duration of the discontinuous reception cycle is initiated based at least in part on a wakeup indication that is transmitted during a wakeup signal monitoring occasion; and receive, in an absence of the wakeup indication being transmitted during the wakeup signal monitoring occasion, an uplink reference signal from the UE during a first time duration that is outside of an active duration of a first discontinuous reception cycle, wherein one or more parameters for communications with the UE are determined based at least in part on the uplink reference signal.

28. The apparatus of claim 27, wherein the instructions to configure are further executable by the at least one processor to cause the access network entity to:
configure a plurality of uplink reference signal resources for transmission of a plurality of uplink reference signals, and
receive one or more uplink reference signals on a subset of the plurality of uplink reference signal resources.

29. The apparatus of claim 27, wherein the instructions are further executable by the at least one processor to cause the access network entity to:
receive, in the absence of the wakeup indication being transmitted to the UE, a channel state information (CSI) report during the first time duration that is outside of the active duration of the first discontinuous reception cycle.

30. The apparatus of claim 27, wherein the first time duration corresponds to a time duration of a discontinuous reception on-duration timer, a configured number of uplink reference signal transmission periods, or to a time duration that is different from the time duration of the discontinuous reception on-duration timer.

* * * * *